US008677368B2

(12) United States Patent
Hashimoto et al.

(10) Patent No.: US 8,677,368 B2
(45) Date of Patent: Mar. 18, 2014

(54) BROADCAST RECEIVING TERMINAL AND PROGRAM EXECUTION METHOD

(75) Inventors: Satoshi Hashimoto, Osaka (JP); Takaaki Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 1214 days.

(21) Appl. No.: 11/421,126

(22) Filed: May 31, 2006

(65) Prior Publication Data

US 2007/0157209 A1 Jul. 5, 2007

Related U.S. Application Data

(60) Provisional application No. 60/685,378, filed on May 31, 2005.

(51) Int. Cl.
*G06F 9/46* (2006.01)
*G06F 15/173* (2006.01)
*H04N 7/16* (2011.01)
*H04N 5/76* (2006.01)

(52) U.S. Cl.
USPC ........... 718/104; 718/103; 709/201; 709/226; 725/131; 725/139; 725/143; 386/293

(58) Field of Classification Search
USPC ............ 718/1–105; 709/223–226; 725/32–36
See application file for complete search history.

(56) References Cited

U.S. PATENT DOCUMENTS

| | | | | |
|---|---|---|---|---|
| 6,329,904 B1 * | 12/2001 | Lamb | | 340/286.02 |
| 6,704,489 B1 * | 3/2004 | Kurauchi et al. | | 386/248 |
| 6,799,208 B1 | 9/2004 | Sankaranarayan et al. | | |
| 6,981,044 B1 * | 12/2005 | Coez et al. | | 709/226 |
| 7,150,020 B2 * | 12/2006 | Kalhour | | 718/104 |
| 7,207,041 B2 * | 4/2007 | Elson et al. | | 718/104 |
| 7,526,766 B2 * | 4/2009 | Asai et al. | | 718/103 |
| 7,610,586 B2 * | 10/2009 | Ismail et al. | | 718/104 |
| 2002/0199199 A1 | 12/2002 | Rodriguez | | |
| 2003/0009769 A1 * | 1/2003 | Hensgen et al. | | 725/131 |
| 2003/0012554 A1 | 1/2003 | Zeidler et al. | | |
| 2003/0204853 A1 * | 10/2003 | Fries et al. | | 725/93 |
| 2004/0209643 A1 | 10/2004 | Welsh | | |
| 2004/0210949 A1 | 10/2004 | Sugiura et al. | | |
| 2005/0100321 A1 | 5/2005 | Koudo et al. | | |
| 2005/0149940 A1 * | 7/2005 | Calinescu et al. | | 718/104 |
| 2006/0078296 A1 | 4/2006 | Takao | | |
| 2007/0094666 A1 * | 4/2007 | Ode | | 718/104 |
| 2009/0222875 A1 * | 9/2009 | Cheng et al. | | 725/147 |

FOREIGN PATENT DOCUMENTS

| | | |
|---|---|---|
| JP | 60-253386 | 12/1985 |
| JP | 2002-281404 | 9/2002 |
| JP | 2002-374219 | 12/2002 |

OTHER PUBLICATIONS

English Language Abstract of JP 2002-281404, Publication date Sep. 27, 2002.
English Language Abstract of JP 2002-374219, Publication date Dec. 26, 2002.

(Continued)

*Primary Examiner* — Abdullah Al Kawsar
(74) *Attorney, Agent, or Firm* — Greenblum & Bernstein, P.L.C.

(57) ABSTRACT

Under a resource manager, unexpected blocking is prevented without calling a handler for resolving a resource contention, by assigning a priority level depending on the program that has requested for a reservation of a resource as well as by assigning a special priority level which permits a reservation of a resource without any conditions in the case of a program which is urgently needed such as an EAS module.

2 Claims, 30 Drawing Sheets

(56) References Cited

OTHER PUBLICATIONS

U.S. Appl. No. 11/383,816 to Hashimoto et al., filed May 17, 2006.
U.S. Appl. No. 11/420,639 to Horii, filed May 26, 2006.
U.S. Appl. No. 11/421,146 to Horii, filed May 31, 2006.
U.S. Appl. No. 10/596,107 to Hashimoto et al., filed May 31, 2006.
Digital Video Broadcasting, Digital Recording Extenstion to Globally Executable MHP (GEM), DVB Document A088, Apr. 2005, pp. 9-15.
ETSI ES 201 812 v1.1.1 (Dec. 2003), Digital Video Broadcasting (DVB); Multimedia Home Platform. (MHP) Specification 1.0.3, pp. 47-51, 61-103, 295-328 and 787, 2003.
OpenCable Application Platform Specification, OCAP 1.0 Profile, OC-SP-OCAP 1.0-114-050119, pp. 47-51, 57-92, and 187-193, 2005.
OpenCable Application Platform Specification, OCAP Digital Video Recorder (DVR), OC-SP-OCAP-DVR-I01-040524, pp. 11-20, 2001.
OpenCable Application Platform Specification, OCAP Digital Video Recorder (DVR), OC-SP-OCAP-DVR-I02-050524, pp. 15-23, 2002.
English language Abstract of JP 60-253386, Date of publication Dec. 14, 1985.

* cited by examiner

FIG. 2

| Frequency Band | Application | Modulation Type |
|---|---|---|
| 5–130MHz | Out Of Band (OOB) Data exchange between broadcast station side system and terminal | QPSK |
| 130–864MHz | In-band Normal television broadcast that includes video/audio | QAM |

FIG. 3

| Frequency Band | Application |
|---|---|
| 70–74MHz | Sending data from broadcast station side system 101 to terminal apparatuses |
| 10.0–10.1MHz | Sending data from terminal apparatus A111 to broadcast station side system 101 |
| 10.1–10.2MHz | Sending data from terminal apparatus B112 to broadcast station side system 101 |
| 10.2–10.3MHz | Sending data from terminal apparatus C113 to broadcast station side system 101 |

FIG. 4

| Frequency Band | Application |
|---|---|
| 150–156MHz | TV Channel 1 |
| 156–162MHz | TV Channel 2 |
| ⋮ | ⋮ |
| 310–311MHz | Radio Channel 1 |
| ⋮ | ⋮ |

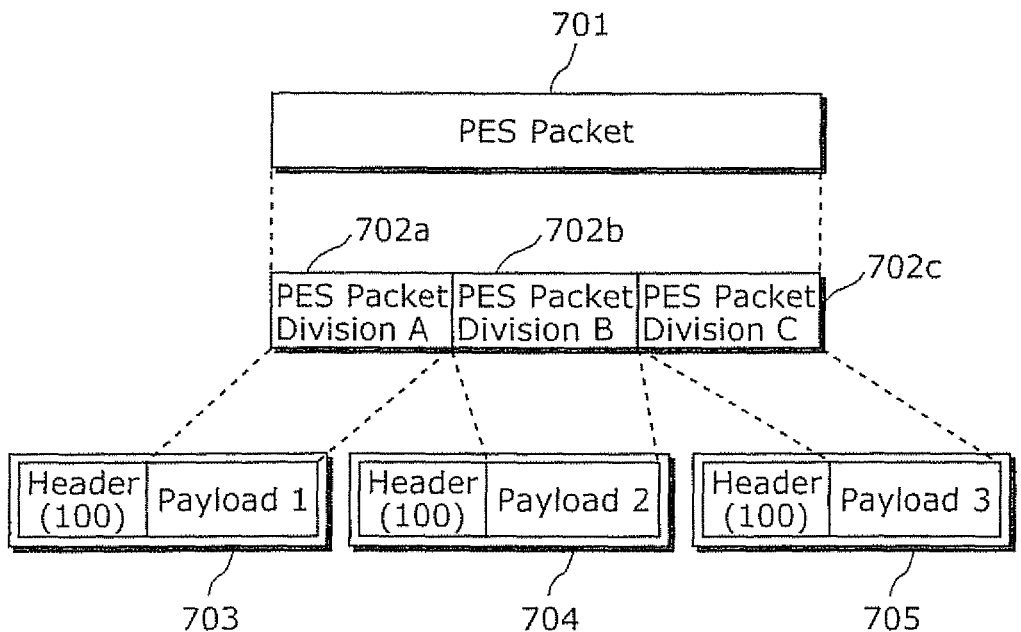
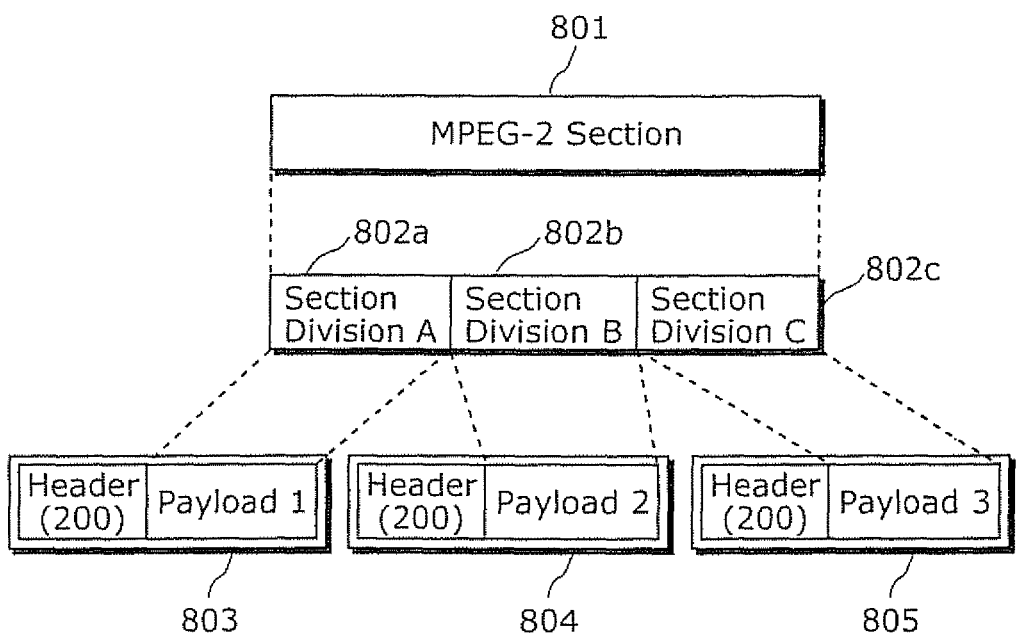

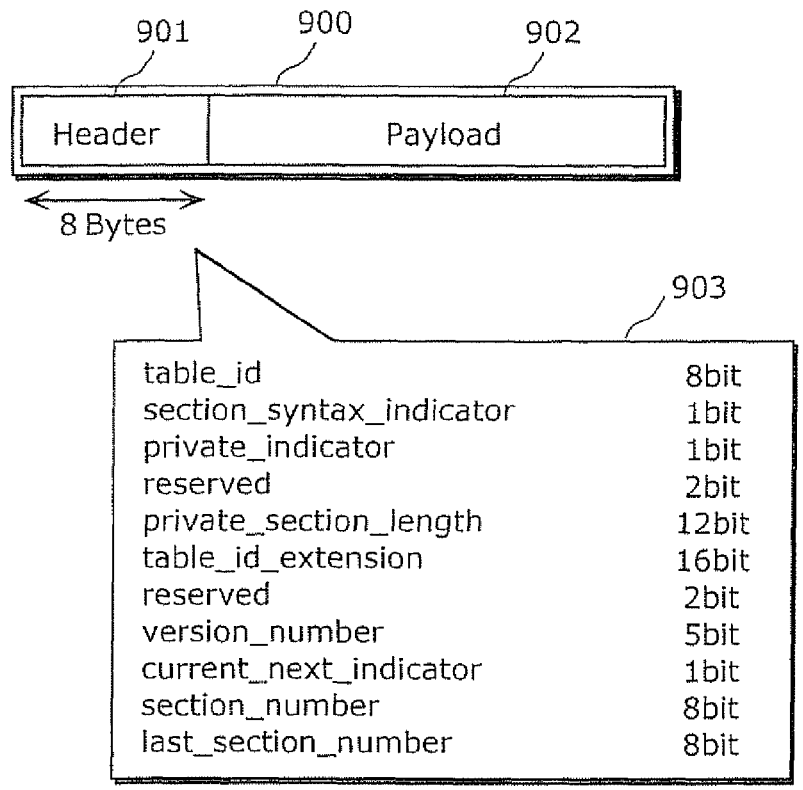

FIG. 11

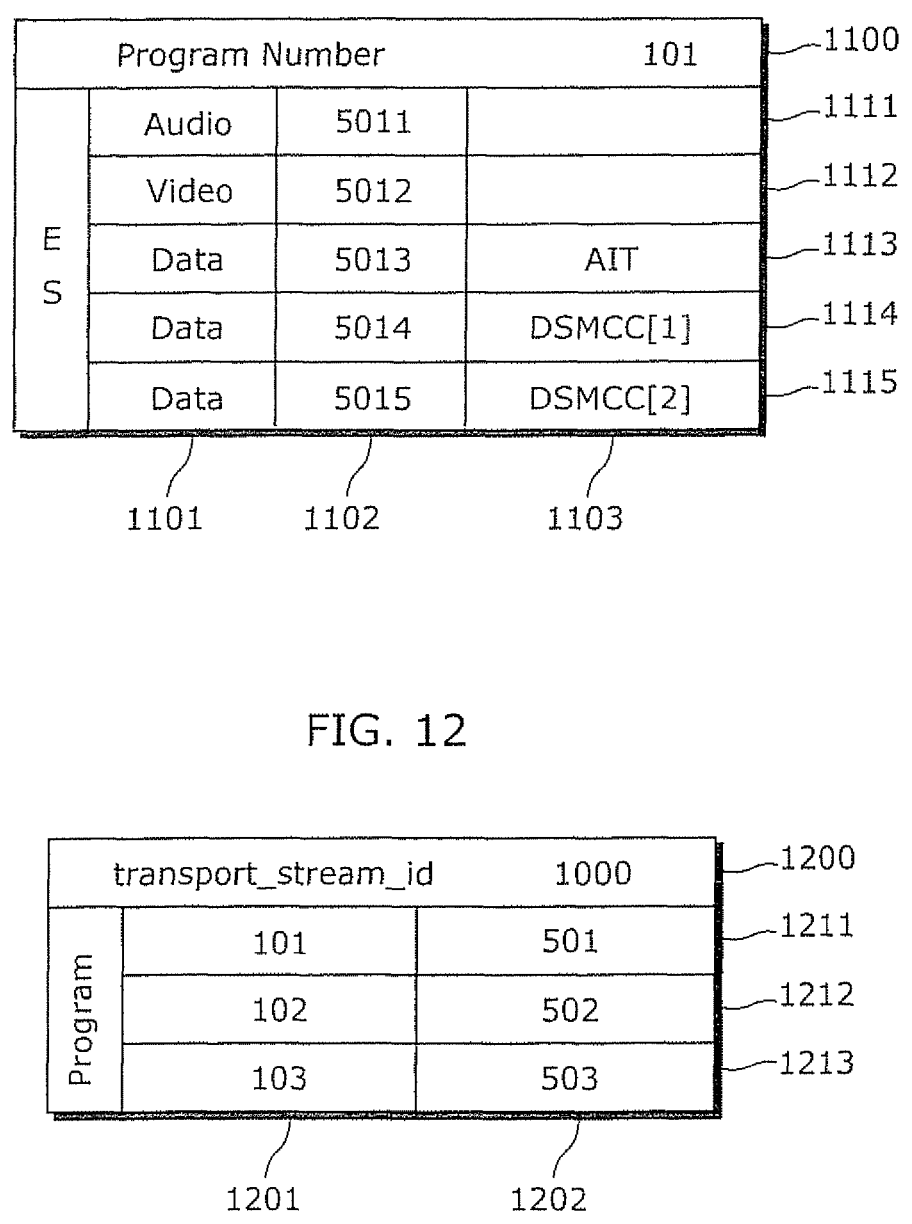

| ES | | | | |
|---|---|---|---|---|
| | Program Number | | 101 | 1100 |
| | Audio | 5011 | | 1111 |
| | Video | 5012 | | 1112 |
| | Data | 5013 | AIT | 1113 |
| | Data | 5014 | DSMCC[1] | 1114 |
| | Data | 5015 | DSMCC[2] | 1115 |

| | transport_stream_id | 1000 | 1200 |
|---|---|---|---|
| Program | 101 | 501 | 1211 |
| | 102 | 502 | 1212 |
| | 103 | 503 | 1213 |

|  | 2001 | 2002 | 2003 1305 | 2004 |
|---|---|---|---|---|
| 2011 | 1 | Channel 1 | 150MHz,.... | 101 |
| 2012 | 2 | Channel 2 | 156MHz,.... | 102 |
| 2013 | 3 | TV 3 | 216MHz,.... | 103 |
| 2014 | 4 | TV Japan | 222MHz,.... | 104 |

FIG. 21

| Record Information Management Table | | | | | |
|---|---|---|---|---|---|
| 000 | 2 | 102 | 2005/03/30 11:00 | 2005/03/30 12:00 | TS_001 |
| 001 | 4 | 104 | 2005/04/01 21:00 | 2005/04/01 23:00 | TS_002 |
| 2101 Record Identifier | 2102 Channel Identifier | 2103 Program Number | 2104 Start Time | 2105 End Time | 2106 Media Identifier |

FIG. 22

| | | | |
|---|---|---|---|
| AIT Version 2 | | | |
| 301 | autostart | 1 | /a/TopXlet |
| 302 | present | 1 | /b/GameXlet |
| 303 | kill | 2 | /z/StudyXlet |
| 304 | destroy | 1 | /b/MusicXlet |

2200 — AIT Version 2
2211 — 301 row
2212 — 302 row
2213 — 303 row
2214 — 304 row 2201 Java Program Identifier
2202 Control Information
2203 DSMCC Identifier
2204 Program Name

FIG. 30

| Reserved Resource | Program | Priority |
|---|---|---|
| Tuner | Module A | 20 |
| AV Encoder | Program B | 10 |
| | | |

| Seized Resource | Program |
|---|---|
| Tuner | Program C |
| | |

| Forcedly-Reserved Resource | Priority Program |
|---|---|
| Tuner | Module B |
| AV Encoder | Program A |
|  |  |

3511, 3512, 3501, 3502, 3503

BROADCAST RECEIVING TERMINAL AND PROGRAM EXECUTION METHOD

CROSS REFERENCE TO RELATED APPLICATION(S)

This application claims the benefit of U.S. Provisional Application No. 60/685,378, filed May 31, 2005, the contents of which are herein incorporated by reference in its entirety.

BACKGROUND OF THE INVENTION (1) Field of the Invention

The present invention relates to a broadcast receiving terminal, in particular, to a setup for facilitating viewing video, audio, and data such as a program by receiving a broadcast wave with which contents made up of video, audio, and data such as a program which are mutually synchronized are multiplexed, as well as a setup for overcoming the case where a contention of a resource such as a tuner occurs between the contents.

(2) Description of the Related Art

Various contents are included in a broadcast wave sent from a broadcast station. Aside from video and audio used in a normal TV show, there are cases where data is included in the contents. There are several methods for sending the data, which can be roughly divided into a method of sending the data chronologically and a method of repeatedly sending the data per set interval. In the former method of sending the data chronologically, for example, data that continues over the course of time is sent in sequential order. This method is suitable for sending large amounts of data over a long period of time, but there is a drawback in that data that could not be received due to timing of the send cannot be received again. On the other hand, in the later method of repeatedly sending the data at a set interval, the same data is repeatedly sent any number of times during a fixed period. This method has an advantage in that during the period when the same data is being sent, any one of the repeatedly-sent pieces of data can be received, and thus the timing of receiving is not limited. Data broadcast, represented by BML, and file sending through DSMCC data carousel are the examples of this method. It is unknown, particularly in broadcast, when a recipient will select a channel and commence reception. In the method of sending the data chronologically, when the start of reception falls behind the timing of the sending and acquisition of the data fails, the data cannot be re-acquired. Therefore, when sending data such as an application program along with video and audio in the broadcast wave, the method of repeatedly sending the data per set interval is favorable.

At present, specifications for receiving a broadcast wave that includes video, audio, and an application program and executing the application program in synchronization with video and audio, as in the above method, have been developed and are in operation. It is possible to receive the sent application program, load the application program into a broadcast receiving terminal (hereinafter to be simply referred to as "terminal" or "terminal apparatus"), and implement various extra functions by executing the application program, rather than simply viewing the video and audio. This method for sending the application program and importing the application program into the terminal is also called "downloading". For example, a specification called Digital Video Broadcasting-Multimedia Home Platform (DVB-MHP) ETSIES201812 v1.1.1 (2003-12) has been developed in Europe, and operations according to this specification have already commenced. In addition, Open Cable Application Platform (OCAP), which provides the same specification in the cable broadcast environment in the United States, is being developed in the United States, and actual operations are set to commence. In these specifications, the application program is written in the lava language. Various Application Programming Interfaces (APIs) for tuning, graphics display, and the like are provided in the terminal, and the Java application program can control those functions by calling the APIs In addition, in North America, the OCAP-DVROC-SP-OCAP-DVR-I01-040524 specification, which is aimed at adding a function for recording and reproducing the contents in the OCAP specification, is being developed. With this specification, the video, audio, and the lava application program synchronized therewith are executed, which are sent as a cable television broadcast, are recorded as contents, and furthermore, are reproduced in the same manner as when the recorded contents are directly reproduced from the broadcast wave. The application program is reproduced in synchronization with the video and audio, in the same manner as direct reproduction from the broadcast wave.

Moreover, with OCAP-DVR, trick play of the contents is realized by recording broadcast contents to a high-speed random-accessible storage medium, such as a hard disk, a semiconductor memory, and the like. Here, the trick play refers to functions for reproducing the contents at an arbitrary speed, from an arbitrary position, and so on, such as fast-forward, rewind, slow-motion, pause, skip, and the like. With OCAP-DVR, the application program imported into the terminal from the broadcast wave can control the recording and trick play of the contents. In other words, APIs for recording and trick play are provided in the terminal, and the Java application program controls each function by calling those APIs.

Normally, in order that the application program is executed in synchronization with the video and audio, control information for the synchronization is already multiplexed in the broadcast wave. The application program is sequentially executed according to the synchronization control information and is terminated. Thus, it is possible to execute the application program by switching the program to an appropriate one in accordance with a specific scene of video and audio.

The OCAP and OCAP-DVR standards provide for the case where a contention between resources such as tuners and AV encoders occurs between the application programs, and defines a framework of invoking a handler previously registered by a privileged application program or a framework that is based on priorities held by the application programs, aiming to overcome such case.

SUMMARY OF THE INVENTION

As has been described above, the OCAP and OCAP-DVR standards provide for the case where a contention of a resource such as a tuner and an AV encoder occurs between the application programs, and defines a framework of invoking a handler previously registered by a privileged application program or a framework that is based on priorities held by the application programs, aiming to overcome such case. Even in the case where the contention of a resource occurs, the resources are appropriately assigned to the application programs according to the framework.

In the case of invoking the handler previously registered by a privileged application program in order to solve a contention of a resource, there is a possibility that the call may be blocked by a wait of user's input or the like. Though being blocked, there normally should be no problems, but in the case where a forced tuning has to be executed for notifying the user of an alert by an Emergency Alert System (EAS), when the call is blocked by the handler, the notification to the user may be delayed.

In order to solve the above problem, in the case of emergency such that the forced tuning has to be executed in order to inform the user of the EAS alert, the handler that may block shall not be invoked even though the handler is previously registered by the privileged application program.

The present invention is therefore conceived in view of the above-mentioned problems, and an object of the present invention is to provide a broadcast receiving terminal which can promptly execute forced tuning so as to inform the user of an alert without destroying the conventional framework for solving the problem of resource contention and without unexpected blocking upon invoking a resource contention handler already registered by a privileged Java program, even in the case where forced tuning is caused by EAS.

The first invention is a broadcast receiving terminal including: a program execution unit which controls execution of a program having a pre-set priority level; a resource contention detection unit which detects, in the case where a reservation of a resource is requested according to the execution of the program performed by the program execution unit, whether or not a contention occurs due to the fact that the requested resource has already been reserved by another program to be executed by the program execution unit; and sets, in the case where a reservation of a resource is requested by a specified program among the programs to be executed by the program execution unit, a priority level of the specified program as the highest; a resource reservation program determination unit which determines, when the contention occurs, to permit a program having the highest priority level to reserve the resource that is under contention; and a resource reservation program notification unit which notifies of the reservation of the resource to the program which is permitted to reserve the resource, based on the determination made by the resource reservation program determination unit.

The second invention is a broadcast receiving terminal which includes: a program execution unit which controls execution of a program for which a priority level is pre-set; a resource contention detection unit which detects, in the case where a reservation of a resource is requested according to the execution of the program performed by the program execution unit, whether or not a contention occurs due to the fact that the requested resource has already been reserved by another program to be executed by the program execution unit; a resource reservation program determination unit which determines, when the contention occurs, to: permit a program having a highest priority level to reserve the resource which is under contention, in the case where the program requesting the reservation of the resource is not a specified program, and permit the specified program to reserve the resource which is under contention, in the case where the program requesting the reservation of the resource is the specified program; and a resource reservation program notification unit which notifies of the reservation of the resource to the program which is permitted to reserve the resource, based on the determination made by the resource reservation program determination unit.

Note that the present invention can be realized not only as such broadcast receiving terminal, but also as a method of executing a program in the broadcast receiving terminal, and as a program for the broadcast receiving terminal, and even as a computer-readable storage medium, such as a CD-ROM, in which the program is stored.

With the broadcast receiving terminal and the program execution method according to the present invention, it is possible to rapidly execute a forced tuning so as to notify the user of an alert, without destroying the conventional framework for solving the problem of resource contention and without unexpected blocking upon invoking a resource contention handler already registered by a privileged Java program even in the case where forced tuning is caused by EAS.

As further information about technical background to this application, the disclosure of U.S. Provisional Application No. 60/685,378, filed May 31, 2005, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is an example of how to use a frequency band used in communications between a broadcast station side system and a terminal apparatus in a cable television system according to the present invention;

FIG. 3 is an example of how to use a frequency band used in communications between a broadcast station side system and a terminal apparatus in a cable television system according to the present invention;

FIG. 4 is an example of how to use a frequency band used in communications between a broadcast station side system and a terminal apparatus in a cable television system according to the present invention;

FIG. 7 is an example of division when a PES packet predefined by MPEG-2 specifications is carried in TS packets;

FIG. 8 is an example of division when an MPEG-2 section predefined by MPEG-2 specifications is carried in TS packets;

FIG. 9 is a diagram showing a structure of an MPEG-2 section predefined by MPEG-2 specifications;

FIG. 10 is an example of use of an MPEG-2 section predefined by MPEG-2 specifications;

FIG. 11 is an example of use of a PMT predefined by MPEG-2 specifications;

FIG. 12 is an example of use of a PAT predefined by MPEG-2 specifications;

FIG. 20 is an example of information stored in a secondary storage unit according to the present invention;

FIG. 21 is an example of a record information management table according to the present invention;

FIG. 22 is a schematic diagram showing the details of the AIT prescribed by the DVB-MHP specification according to the present invention;

FIG. 30 is an example of resource management information according to the present invention;

FIG. 31 is an example of processing program information according to the present invention;

FIG. 35 is an example of resource priority reserve program information according to the present invention.

DESCRIPTION OF THE PREFERRED EMBODIMENT(S)

(First Embodiment)

Hereafter, a broadcast receiving terminal and a program execution method according to the first embodiment of the present invention will be described with reference to the drawings. In the present embodiment, a cable television broadcast system is described as an example. In the cable television broadcast system, the broadcast receiving terminal apparatus of the present invention is, for instance, a broadcast recording and reproduction apparatus, and is generally called a terminal apparatus.

Figure 1:
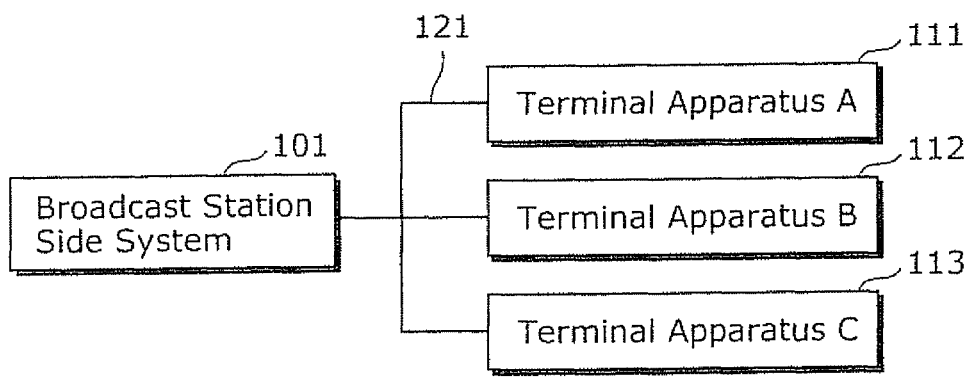
FIG. 1 is a configuration diagram of a broadcast system according to the present invention.

FIG. 1 is a block diagram showing a relationship of apparatuses that make up a broadcast system; the broadcast system is configured of a broadcast station side system 101 (head-end), a terminal apparatus A111, a terminal apparatus B112, and a terminal apparatus C113. A coupling 121 between the broadcast station side system and each terminal apparatus is, in the cable system, a wired coupling such as a coaxial cable, a fiber-optic cable, and the like. In FIG. 1, one broadcast station side system is coupled with three terminal apparatuses, but the number of terminal apparatuses is arbitrary.

The broadcast station side system 101 sends information such as video/audio/data for data broadcast in a broadcast signal to a plurality of terminal apparatuses. The broadcast signal is sent using a frequency within a frequency band set by operational regulations of the broadcast system and the laws of a country/region in which the broadcast system is operated, and so on.

With the cable system according to the present embodiment, the frequency band used in broadcast signal transmission is divided into the data content and transmission direction (inbound, outbound) and then applied. FIG. 2 is a chart indicating one example of the division of the frequency band. The frequency band is roughly divided into two types: Out Of Band (abbr. OOB) and In-Band. 5 MHz to 130 MHz is assigned as OOB, and is mainly used in in-bound/out-bound data exchange between the broadcast station side system 101 and the terminal apparatus A111, the terminal apparatus B112, and the terminal apparatus C113. 130 MHz to 864 MHz is assigned as In-Band, and is mainly used in an outbound-only broadcast channel that includes video/audio. QPSK modulation scheme is used with OOB, and QAM64 or QAM256 modulation type is used with In-Band, Modulation scheme technology is generally known and of little concern to the present invention, and therefore detailed description is omitted. FIG. 3 is one example of a more detailed use of the OOB frequency band. 70 MHz to 74 MHz is used in outbound data sending from the broadcast station side system 101, and all of the terminal apparatus A111, the terminal apparatus B112, and the terminal apparatus C113 receive the same data from the broadcast station side system 101. On the other hand, 10.0 MHz to 10.1 MHz is used in inbound data sending from the terminal apparatus A111 to the broadcast station side system 101; 10.1 MHz to 10.2 MHz is used in inbound data sending from the terminal apparatus B112 to the broadcast station side system 101; and 10.2 MHz to 10.3 MHz is used in inbound data sending from the terminal apparatus C113 to the broadcast station side system 101. Through this, it is possible to independently send unique data from each terminal apparatus A111, B112, and C113 to the broadcast station side system 101. FIG. 4 is one example of use of the In-Band frequency band. 150 MHz to 156 MHz and 156 MHz to 162 MHz are assigned to a TV channel 1 and a TV channel 2 respectively, and thereafter, TV channels are assigned at 6 MHz intervals. Radio channels are assigned in 1 MHz units from 310 MHz on. Each of these channels may be used as analog broadcast or as digital broadcast. In the case of transmitting digital broadcast, a TS packet format based on the MPEG-2 specifications is used for the transmission, and it is also possible to send data for various data broadcast and TV show composition information for configuring EPG, in addition to audio and video.

The broadcast station side system 101 uses the frequency bands described above to send an appropriate broadcast signal to the terminal apparatuses, and therefore, has a QPSK modulation unit, a QAM modulation unit, and so on. In addition, the broadcast station side system 101 has a QPSK demodulator for receiving data from the terminal apparatuses. Moreover, the broadcast station side system 101 can be thought of as having various devices related to the modulation units and the demodulation unit. However, the present invention relates mainly to the terminal apparatuses, and therefore detailed descriptions are omitted.

The terminal apparatuses A111, B112, and C113 have a QAM demodulation unit and a QPSK demodulation unit in order to receive and reproduce a broadcast signal from the broadcast station side system 101. In addition, each terminal apparatus has a QSPK modulation unit in order to send the data unique to the apparatus to the broadcast station system side 101. In the present invention, the terminal apparatuses are broadcast recording and reproduction apparatuses, and detailed configurations will be described later.

The broadcast station side system 101 modulates an MPEG-2 transport stream and transmits the stream within the broadcast signal. The terminal apparatuses receive the broadcast signal, demodulate the broadcast signal so as to reproduce the MPEG-2 transport stream, extract necessary information wherefrom, and use the extracted information. In order to describe a device function and connection structure present in the terminal apparatus, the structure of the MPEG-2 transport stream will be first described in a simple manner.

Figure 5:
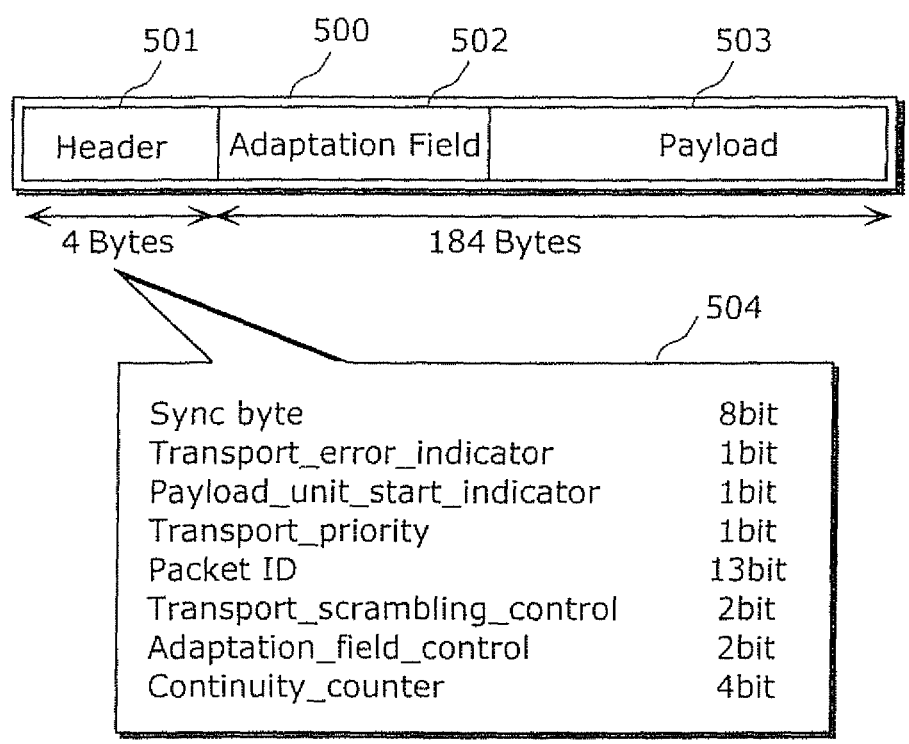
FIG. 5 is a diagram showing a structure of a TS packet predefined by MPEG-2 specifications.

FIG. 5 is a diagram showing the structure of a TS packet. A TS packet 500 has a length of 188 bytes, and is composed of a header 501, an adaptation field 502, and a payload 503. The header 501 holds control information of the TS packet. The header 501 has a length of 4 bytes, and a structure presented by 504. In the header 501 there is a field denoted as "Packet ID" (hereafter, PID), and the TS packet is identified through the value of this PID. The adaptation field 502 holds additional information such as time information. The adaptation field 502 does not necessarily have to be present, and there are cases where the adaptation field 502 is not present. The payload 503 holds information carried in the TS packet, such as video, audio, and data broadcast data.

Figure 6:
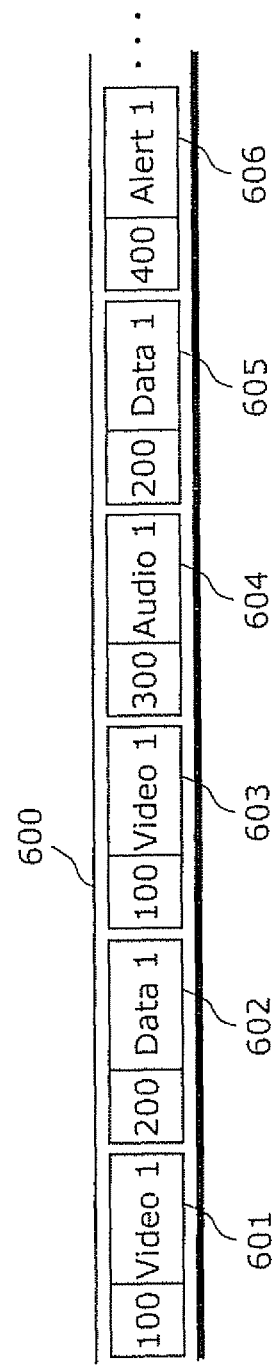
FIG. 6 is a schematic diagram of an MPEG-2 transport stream.

FIG. 6 is a schematic diagram of an MPEG-2 transport stream; The TS packet holds various information in the payload, such as video, audio, data used for data broadcast, alert, and the like. A TS packet 601 and a TS packet 603 hold a PID 100 in the header, and hold information regarding video 1 in the payload. A TS packet 602 and a TS packet 605 hold a PID 200 in the header, and hold information regarding data 1 in the payload. A TS packet 604 holds a PID 300 in the header, and holds information regarding audio 1 in the payload. A TS packet 606 holds a PID 400 in the header, and holds information regarding alert 1 in the payload. Mixing TS packets which hold various types of data in the payloads and transmitting these as a series in sequence is called multiplexing. An MPEG-2 transport stream 600 is one example of a configuration in which the TS packets 601 to 605 are multiplexed.

TS packets that have identical PIDs hold identical types of information. Therefore, the terminal apparatus reproduces video and audio, data such as TV show composition information, by receiving multiplexed TS packets and extracting, per PID, the information held by the TS packet. In FIG. 6, the TS packet 601 and the TS packet 603 each transmit information regarding the video 1, and the TS packet 602 and the TS packet 605 each transmit information regarding the data 1.

Here, description is given regarding a format of various types of data contained in the payload.

Video and audio are represented by a format called a Packetized Elementary Stream (PES) packet. The PES packet includes video information and audio information of a certain time period, and by receiving the PES packet, the broadcast recording and reproduction apparatus can output the video and audio information contained in that PES packet to a screen and a speaker. The broadcast station transmits the PES packets without pause, and therefore it is possible for the broadcast recording and reproduction apparatus to continuously reproduce the video and audio without pause. When the PES packet is actually transmitted, the PES packet is divided and stored in the payloads of a plurality of TS packets in the case where the PES packet has a size larger than the payload of one TS packet. FIG. 7 shows an example of the division when a PES packet is transmitted. A PES packet 701 is too large to be stored and transmitted in a payload of a single TS packet, and therefore the PES packet 701 is divided into a PES packet division A 702a, a PES packet division B 702b, and a PES packet division C 702c, and is carried in three TS packets 703 to 705 which have identical PIDs. In actuality, the video and audio is obtained as an elementary stream (ES) that is obtained by concatenating data contained in the payloads of a plurality of PES packets. The elementary stream is in the form of digitalized video and audio, such as defined by the MPEG-2 Video standards, the MPEG-1 and 2 Audio standards, and the like.

On the other hand, information such as the TV show composition information and data used for data broadcast is expressed using a format called MPEG-2 section. When the MPEG-2 section is actually transmitted, the MPEG-2 section is divided and stored in the payloads of a plurality of TS packets in the case where the MPEG-2 section has a size larger than the payload of one TS packet. FIG. 8 shows an example of the division when the MPEG-2 section is transmitted. As an MPEG-2 section 801 is too large to be stored and transmitted in a payload of a single TS packet, the MPEG-2 section 801 is divided into a section division A 802a, a section division B 802b, and a section division C 802c, and is carried in three TS packets 803 to 805 which have identical PIDs.

FIG. 9 presents a structure of such MPEG-2 section. An MPEG-2 section 900 is structured by a header 901 and a payload 902. The header 901 holds control information of the MPEG-2 section. The composition of the header 901 is presented by a header structure 903. The payload 902 holds data transmitted by the MPEG-2 section 900. A table_id present in the header configuration 903 represents the type of the MPEG-2 section, and a table_id_extension is an extension identifier used when further distinguishing between MPEG-2 sections, each having an identical table_id. The case of transmitting the TV show composition information is shown in FIG. 10 as an example of use of the MPEG-2 section. In this example, as written in a row 1004, information necessary for demodulation of the broadcast signal is written in the MPEG-2 section that has a table_id of 64 in the header configuration 903, and this MPEG-2 section is further transmitted by a TS packet with a PID of 16.

The PES format does not exist in the case of the MPEG-2 section. For that reason, the elementary stream (ES) is a concatenation of the payloads of the TS packets identified by the identical PIDs within the MPEG-2 transport stream. For example, in FIG. 8, all of the TS packets 803 to 805, in which the MPEG-2 section 801 is divided and transmitted, are identified with the PID of 200. It can be said that this is an ES which transmits the MPEG-2 section 801.

A concept called a program further exists in the MPEG-2 transport stream The program is expressed as a collection of ESs, and is used in the case where handling a plurality of ESs all together is desirable. With the use of the program, it is possible to handle video/audio, as well as accompanying data broadcast data, all together. For example, in the case of handling together the video/audio to be simultaneously reproduced, by grouping the video ES and the audio ES as a program, it can be seen that the broadcast recording and reproduction apparatus should simultaneously reproduce these two ESs as one TV show.

To express the program, two tables, called a Program Map Table (PMT) and a Program Association Table (PAT) are used in MPEG-2. Detailed descriptions can be found in the specifications of ISO/IEC 13818-1, "MPEG-2 Systems". The PMT and the PAT are briefly described hereafter.

The PMT is a table included in the MPEG-2 transport stream, in a number as many as that of the program. The PMT is configured as an MPEG-2 section, and has a table_id of 2. The PMT holds a program number used in identifying the program and additional information of the program, as well as information regarding an ES belonging to the program. An example of the PMT is given in FIG. 11. 1100 is a program number. The program number is assigned uniquely to programs in the same transport stream, and is used in identifying the PMT. Rows 1111 to 1115 express information regarding individual ESs. A column 1101 is a type of ES, in which "video" "sound", "data", and so on are specified. A column 1102 is the PID of the TS packets that make up the ES. A column 1103 is additional information regarding the ES. For example, the ES shown in row 1111 is an audio ES, and is carried in the TS packets with a PID of 5011.

The PAT is a table, of which only one is present, in the MPEG-2 transport stream. The PAT is configured as an MPEG-2 section, has a table_id of 0, and is carried in the TS packet with a PID of 0. The PAT holds a transport_stream_id used in identification of the MPEG-2 transport stream, and information regarding all the PMTs that represent a program in the MPEG-2 transport stream. An example of the PAT is given in FIG. 12. 1200 indicates a transport_stream_id. The transport_stream_id is used in identifying the MPEG-2 transport stream. Rows 1211 to 1213 express information regarding the program. A column 1201 indicates a program number. A column 1202 indicates the PID of the TS packet which sends the PMT that corresponds to the program. For example, the PMT of the program shown in row 1211 has a program number of 101, and the corresponding PMT is carried in the TS packet with a PID of 501.

In the case where the terminal apparatus reproduces a certain program, the terminal apparatus and specifies the video and audio that make up a program, with reference to the PAT and the PMT, and reproduces that video and audio. For example, in regards to the MPEG-2 transport stream that transmits the PAT in FIG. 12 and the PMT in FIG. 11, the following procedure is taken in the case where the video and audio belonging to the program with a program number of 101 are reproduced. First, a PAT transmitted as an MPEG-2 section with a table_id of "0" is acquired from a TS packet with a PID of "0". The PAT is searched for a program with the program number "101", and row 1211 is obtained. From row 1211, the PID "501", of the TS packet which transmits the PMT of the program with a program number "101", is obtained. Next, the PMT transmitted as a MPEG-2 section with a table_id of "2" is acquired from the TS packet with a PID of "501". Row 1111, which is audio ES information, and row 1112, which is video ES information, are obtained from the PMT. A PID "5011" of the TS packet which transmits the audio ES is obtained from row 1111. In addition, a PID "5012" of the TS packet which transmits the video ES is obtained from row 1112. Next, an audio PES packet is acquired from the TS packet with a PID "5011", and a video PES packet is acquired from the TS packet with a PID of "5012". Through this, it is possible to acquire the video and audio ES packets to be reproduced, and the video and audio which make up the program number 101 can be reproduced.

Note that there are cases where the MPEG-2 transport stream is scrambled. This is a setup called conditional access system. For example, by scrambling the PES packets which transmit certain video/audio information, only specified viewers who can descramble them are able to view that video and audio information. In order to descramble them and view the video and audio, a viewer must descramble using a device called a descrambler. For example, in an OCAP-compatible terminal apparatus, a card-type adapter with a built-in descrambler is used. A cable television operator distributes an adapter configured to be able to descramble a specific program to each viewer, and the viewer inserts that adapter into the terminal apparatus. Upon doing so, the adapter descrambles the specific program based on descrambling information such as a descrambling key and contract information of each contract holder. A method of descrambling, a method of obtaining the descrambling key, and the like, depend on the adapter, and have no influence on the realization of the present invention.

Thus far, simple descriptions regarding the MPEG-2 specifications have been provided; hereafter, detailed definitions of terminology are given. In the present invention, two types of the term "program" exist. One is a "program" which appears in the MPEG-2 specifications, and the other is a "program" referring to an assemblage of code executed by a CPU. As the former is synonymous with the term "service" used in the operation regulations, hereafter, to avoid confusion, the former is called "service" and the latter is called simply "program". Furthermore, concerning the latter, a "program" particularly written in the Java language is called a "Java program".

Description has been given regarding several kinds of general information specified in the MPEG-2 specifications, according to the present invention. Hereafter, a hardware configuration prerequisite to the present embodiment is described.

Figure 13:
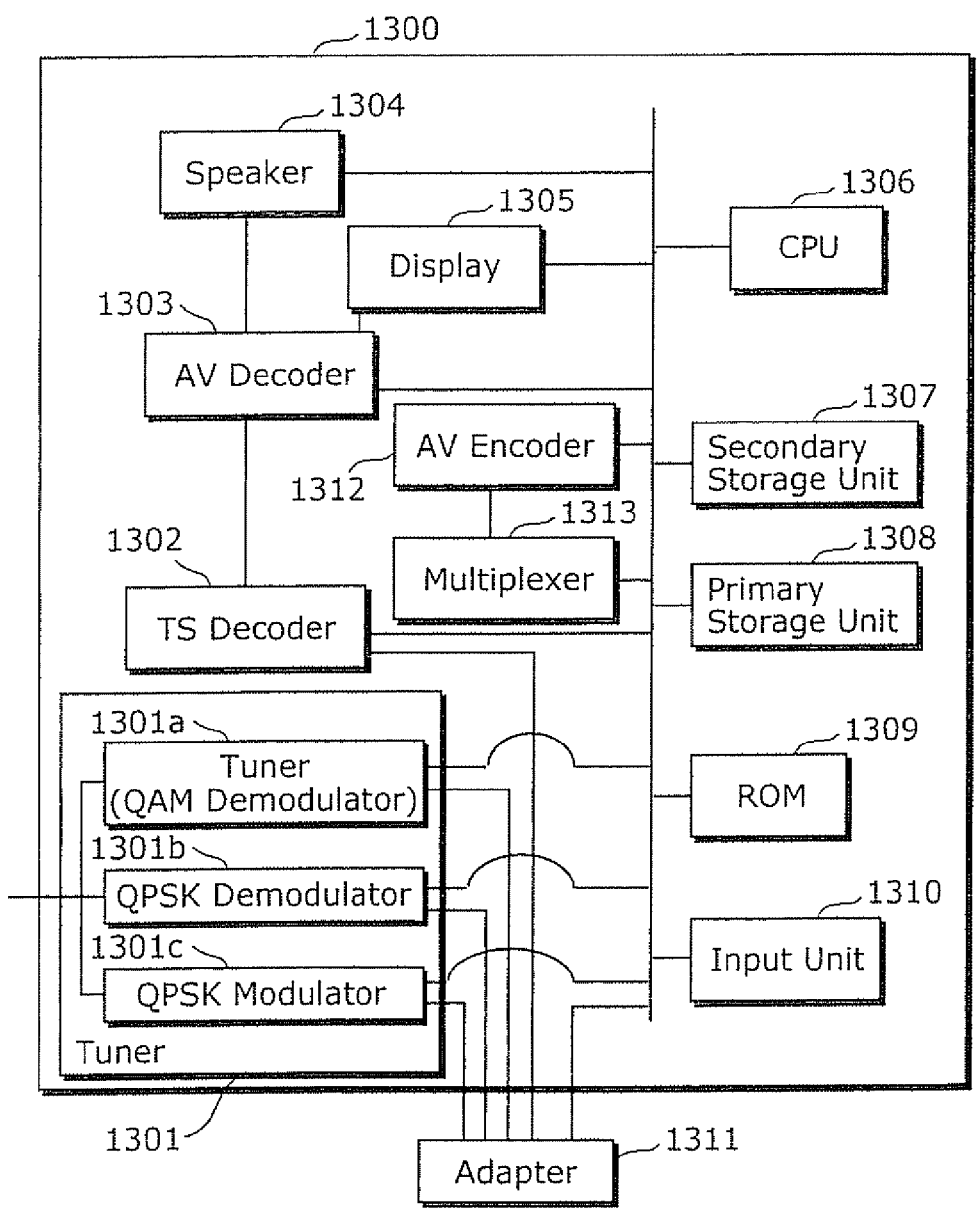
FIG. 13 is a configuration example of a hardware configuration of a broadcast recording and reproduction apparatus according to the present invention.

FIG. 13 is a block diagram showing a general hardware configuration of the broadcast recording and reproduction apparatus according to the present embodiment; in other words, a specific internal configuration of the terminal apparatuses 111, 112, and 113 shown in FIG. 1. 1300 is the broadcast recording and reproduction apparatus, which is configured of: a tuner 1301; a TS decoder (TS Demultiplexer) 1302; an AV decoder 1303; a speaker 1304; a display 1305; a CPU 1306; a secondary storage unit 1307; a primary storage unit 1308; a ROM 1309; an input unit 1310; an adapter 1311; an AV encoder 1312; and a multiplexer (MPEG-2 Transport Stream Multiplexer or the like) 1313. Note that the present embodiment is obtained by expanding a broadcast recording and reproduction terminal implemented by the OCAP-DVR specifications and the basic hardware configuration is nearly identical to that required by the OCAP-DVR specifications.

The tuner 1301 is a device which demodulates a broadcast signal modulated and transmitted from the broadcast station side system 101, in accordance with tuning information including a frequency prescribed by the CPU 1306. Here, the tuning information is information that can specify a frequency, a modulation method, and the like. An MPEG-2 transport stream, obtained as a result of the demodulation performed by the tuner 1301, passes through the adapter 1311 that has a descrambling function, and is sent to the TS decoder 1302.

The TS decoder 1302 is a device which has a function to segregate PES packets and MPEG-2 sections which comply with specified conditions from the MPEG-2 transport stream, based on a PID, a section filter condition, and so on prescribed by the CPU 1306. In the case where a broadcast is received and a service is reproduced without recording, the MPEG-2 transport stream outputted by the adapter 1311 is inputted to the TS decoder 1302. On the other hand, in the case of reproducing a service recorded in the secondary storage unit 1307, the MPEG-2 transport stream which the secondary storage unit 1307 outputs is inputted to the TS decoder 1302. Which input to receive is controlled by the CPU 1306.

The PES packets of the video and audio segregated by the TS decoder 1302 are outputted to the AV decoder 1303. In addition, the MPEG-2 section segregated by the TS decoder 1302 is transferred to the primary storage unit 1308 through Direct Memory Access (DMA), and is used by a program executed by the CPU 1306.

The AV decoder 1303 is a device with a function to decode the encoded video ES and audio ES. The AV decoder fetches the ES from the PES packet that transmits the audio and video information sent from the TS decoder, and decodes the ES. An audio signal and a video signal obtained through the decoding performed by the AV decoder 1303 are sent to the speaker 1304 and the display 1305 at the time of service reproduction, but are sent to the AV encoder 1312 at the time of service recording. Which output route to take is controlled by the CPU 1306 according to an instruction from the user.

The speaker 1304 reproduces audio outputted from the AV decoder 1303.

The display 1305 reproduces video outputted from the AV decoder 1303.

The CPU 1306 executes a program that operates in the broadcast recording and reproduction apparatus. The CPU 1306 executes a program contained in the ROM 1309. Or, the CPU 1306 also executes a program downloaded from a broadcast signal or a network and held in the primary storage unit 1308. Or, the CPU 1306 executes a program downloaded from a broadcast signal or a network and held in the secondary storage unit 1307. The tuner 1301, TS decoder 1302, AV decoder 1303, speaker 1304, display 1305, secondary storage unit 1307, primary storage unit 1308, ROM 1309, input unit 1310, adapter 1311, AV encoder 1312 and multiplexer 1313 are controlled in accordance with the directions of the executed program. In addition, the CPU 1306 is capable of controlling the adapter 1311 by communicating not only with the devices present within the terminal apparatus 1300, but also with the devices within the adapter 1311.

The secondary storage unit 1307 is a memory apparatus, the memory of which is not deleted even if the power supply to the device is interrupted. Such secondary storage unit 1307 is configured of devices, e.g., a nonvolatile memory such as a FLASH-ROM, a Hard Disk Drive (HDD), a rewritable media such as a CD-R and a DVD-R, the information of which is not deleted even if the power supply of the terminal apparatus 1300 is cut off. The secondary storage unit 1307 saves information according to an instruction from the CPU 1306.

The primary storage unit 1308 is a device which has a function for temporarily saving information in accordance with an instruction from the CPU 1306, a DMA-transmittable device, and so on, and is configured of a RAM or the like.

The ROM 1309 is a non-rewritable memory device, and to be more specific, is configured of a ROM, a CD-ROM, a DVD, and the like. The program which the CPU 1306 executes is stored in the ROM 1309.

Figure 14:
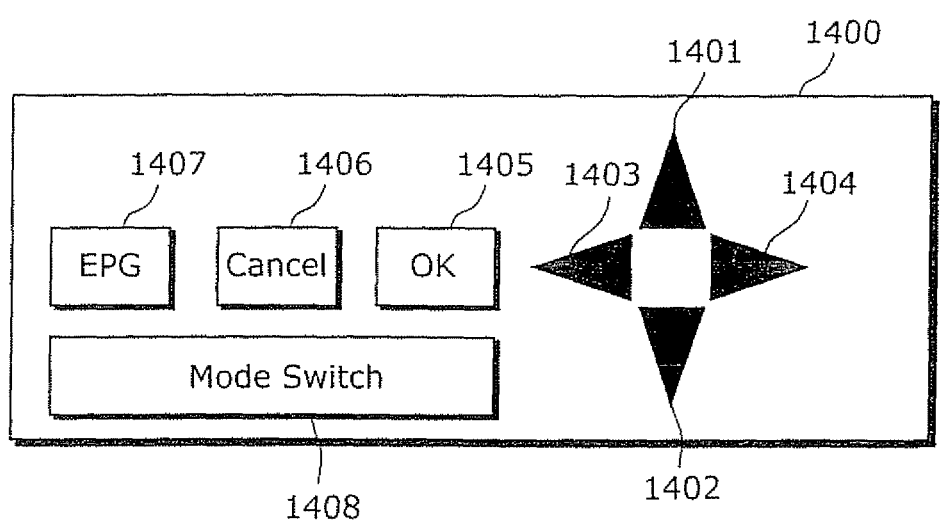
FIG. 14 is an example of a front panel of an input unit 1310 in a hardware configuration of a terminal apparatus 1200 according to the present invention.

The input unit 1310 is, to be more specific, configured of a front panel or a remote control receiver, and accepts an input from the user FIG. 14 is one example of a case where the input unit 1310 is configured of the front panel. A front panel 1400 has seven buttons: an up cursor button 1401, a down cursor button 1402, a left cursor button 1403, a right cursor button 1404, an OK button 1405, a cancel button 1406, an EPG button 1407, and a mode switch button 1408. When the user presses a button, an identifier of the pressed button is notified to the CPU 1306.

The adapter 1311 is a device for descrambling a scrambled MPEG-2 transport stream sent in the In-band frequency range, and includes one or more descramblers. The MPEG-2 transport stream outputted by the tuner 1301a is inputted into the adapter 1311, and descrambling is carried out on the TS packet that has the PID specified by the CPU 1306. The adapter 1311 outputs the descrambled MPEG-2 transport stream to the TS decoder 1302.

Furthermore, the adapter 1311 carries out format conversion of data sent in an OOB frequency range. The information sent in the OOB frequency range may be alert information that urgently needs to be displayed, and is modulated by the QPSK modulation scheme. Regarding outbound transmission, the QPSK demodulator 1301b demodulates the outgoing signal sent from the broadcast station side system 101, and inputs a generated bit stream into the adapter 1311. The adapter 1311 extracts information specified by the CPU 1306 from the various information included in the bit stream, converts the information to a format that can be interpreted by a program that operates in the CPU 1306, and provides this to the CPU 1306. On the other hand, regarding inbound transmission, the CPU 1306 inputs information to be sent to the broadcast station side system 101 into the adapter 1311. The adapter 1311 converts the information inputted from the CPU 1306 to a format that can be interpreted by the broadcast station side system 101, and inputs this to the QPSK modulator 1301c. The QPSK modulator 1301c QPSK-modulates the information inputted from the adapter 1311, and sends this to the broadcast station side system 101.

A Cable CARD, formerly called a Point of Deployment (POD), used in the United States cable system, can be given as a specific example of the adapter 1311.

The AV encoder 1312 encodes the audio signal decoded by the AV decoder 1303 into audio in the MPEG audio format, and encodes the video signal into video in the MPEG video format. The video and audio encoded by the AV encoder 1312 are outputted to the multiplexer 1313.

The multiplexer 1313 is a device with a function for multiplexing the video and audio inputted from the AV encoder 1312 into an MPEG-2 transport stream.

An operation in which the broadcast recording and reproduction apparatus described above records a service contained in a broadcast wave into the secondary storage unit 1307, and an operation where the broadcast recording and receiving apparatus consecutively reads out from the secondary storage unit 1307 and reproduces the service, is hereafter described in detail.

First, the operation in which the service contained in the broadcast wave is recorded into the secondary storage unit 1307 is described.

Figure 15:
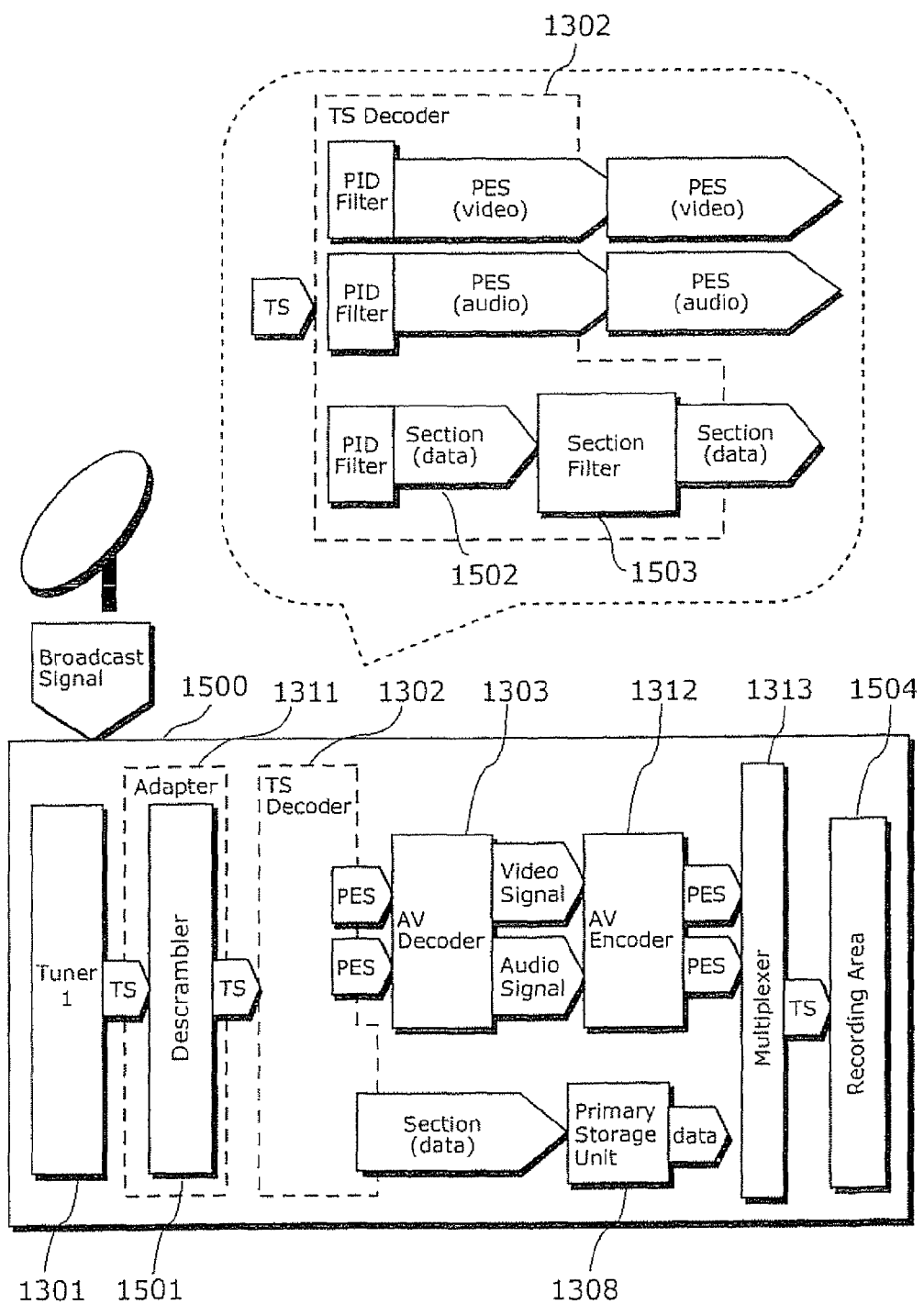
FIG. 15 is an example of a device connection at the time of recording, in the recording and reproduction apparatus according to the present invention.

FIG. 15 shows a conceptual rendering which represents the physical connection sequence, processing details, and input/output data format of each device during recording of the service. 1500 is a terminal apparatus, which has: the tuner 1301; the adapter 1311; a descrambler 1501; the TS decoder 1302; a PID filter 1502; a section filter 1503; the AV decoder 1303; the primary storage unit 1308; the AV encoder 1312; the multiplexer 1313; and a recording area 1504. Constituent elements in FIG. 15 that have the same numbers as in FIG. 13 have the same functions and thus descriptions are omitted.

First, the tuner 1301 performs tuning on the broadcast wave in accordance with tuning information prescribed by the CPU 1306. Here, the tuning information is information that can specify a frequency, a modulation method, and the like. The tuner 1301 demodulates the broadcast wave and inputs the MPEG-2 transport stream into the adapter 1311.

The descrambler 1501, which is within the adapter 1311, descrambles from the MPEG-2 transport stream based on conditional access information for each viewer. The descrambled MPEG-2 transport stream is inputted into the TS decoder.

Two types of devices that process the MPEG-2 transport stream are present within the TS decoder 1302: the PID filter 1502 and the section filter 1503. The PID filter 1502 extracts, from the inputted MPEG-2 transport stream, a TS packet that has a PID specified by the CPU 1306, and then extracts a PES packet and an MPEG-2 section present in that payload. For example, when the MPEG-2 transport stream in FIG. 6 is inputted in the case where the CPU 1306 has instructed PID filtering which extracts the TS packet with a PID=100, packets 601 and 603 are extracted, then concatenated, and thus a PES packet of a video 1 is reconfigured. Or, when the MPEG-2 transport stream in FIG. 6 is inputted in the case where the CPU 1306 has instructed PID filtering which extracts the TS packet with a PID=200, packets 602 and 605 are extracted, then concatenated, and thus an MPEG-2 section of data 1 is reconfigured.

The section filter 1503 extracts, from among the inputted MPEG-2 sections, the MPEG-2 section which conforms to a section filter condition specified by the CPU 1306 and DMA-transfers this MPEG-2 section to the primary storage unit 1308. For example, the CPU 1306 specifies, to the section filter 1503, PID filtering which extracts the TS packet with a PID 200, and section filtering which extracts a section with a table_id of 64. As mentioned earlier, after the MPEG-2 section of the data 1 is reconfigured, the section filter 1503 extracts only the section with a table_id of 64 from among those MPEG-2 sections, and DMA-transfers this to the primary storage unit 1308.

The MPEG-2 section that is inputted into the primary storage unit 1308 is inputted into the multiplexer 1313.

A video PES packet and an audio PES packet extracted by the TS decoder 1302 are inputted into the AV decoder 1303.

The AV decoder decodes the video PES packet so as to convert it into video, and inputs the video into the AV encoder 1312. The AV decoder also decodes the audio PES packet so as to convert it into audio, and inputs the audio into the AV encoder 1312.

The AV encoder 1312 converts the video into MPEG video and inputs this into the multiplexer 1313. The AV encoder 1312 also converts the audio into MPEG audio and inputs this into the multiplexer 1313.

The multiplexer 1313 multiplexes the MPEG video and MPEG audio inputted from the AV encoder, with the MPEG-2 section is inputted from the primary storage unit 1308, and thus generates an MPEG-2 transport stream. The generated MPEG-2 transport stream is recorded into the recording area 1504.

The recording area 1504 is made up of all or a part of the secondary storage unit 1307, or another recording area, and records the MPEG-2 transport stream that makes up a service.

Next, an operation, in which the service is consecutively read out from the secondary storage unit 1307 and reproduced, will be described.

Figure 16:
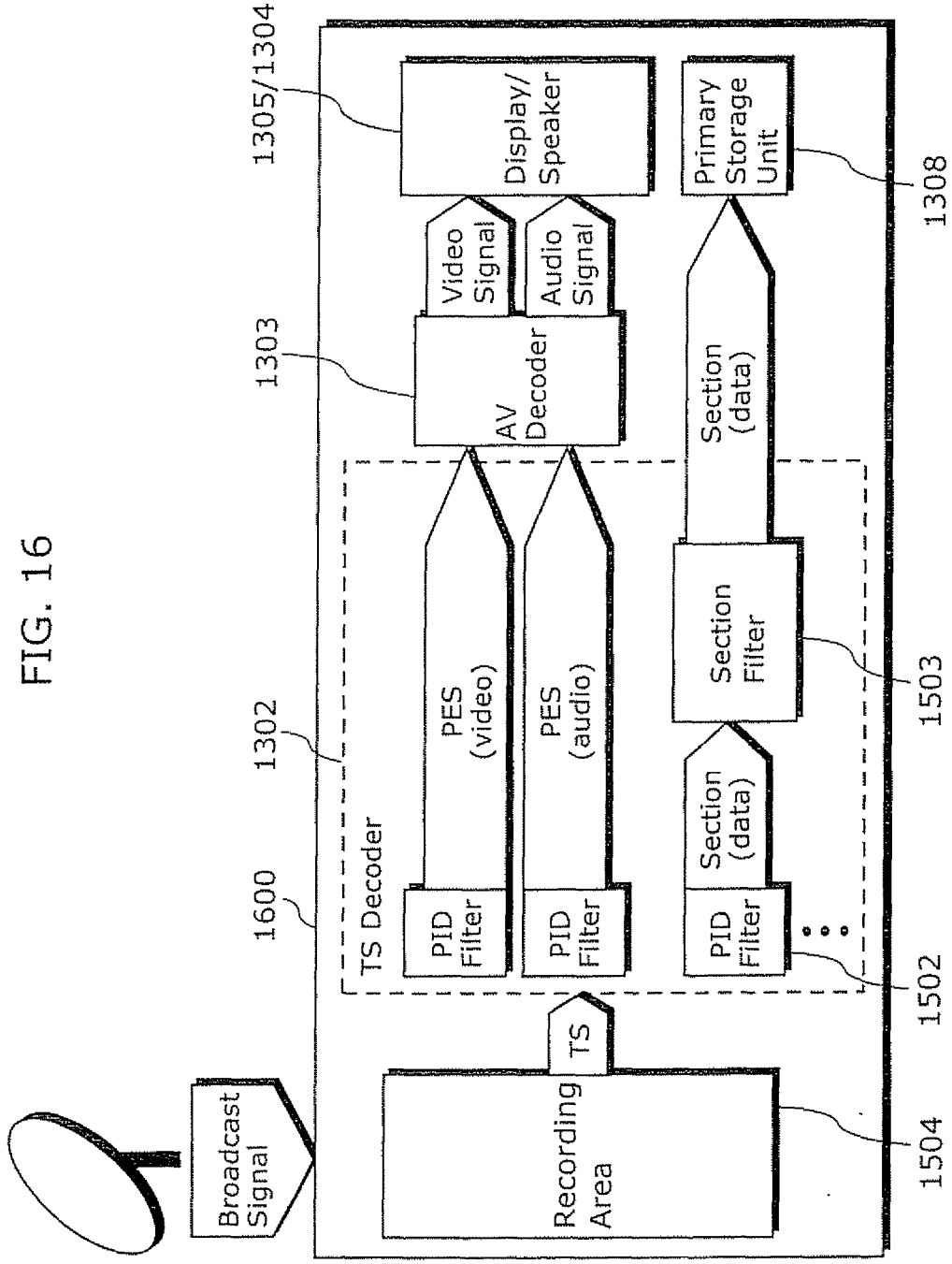
FIG. 16 is an example of a device connection at the time of reproduction, in the recording and reproduction apparatus according to the present invention.

FIG. 16 shows a conceptual rendering which represents the physical connection sequence, processing details, and input/output data format of each device during reproduction of the service. 1600 is a terminal apparatus, which has: the recording area 1504; the TS decoder 1302; the PID filter 1502; the section filter 1503; the AV decoder 1303; the speaker 1304; the display 1305; and the primary storage unit 1308. Constituent elements in FIG. 16 that have the same numbers as in FIG. 13 have the same functions and thus the description is omitted.

In the order described in FIG. 15, the MPEG-2 transport stream recorded in the recording area 1504 is inputted into the TS decoder 1302.

Then, a video PES and an audio PES that have a PID specified by the CPU 1306 are extracted by the PID filter 1502 within the TS decoder 1302. The extracted PES packet is inputted into the AV decoder 1303. Or, the MPEG-2 section that has a PID and a table_id specified by the CPU 1306 is extracted by the PID filter 1502 and the section filter 1503 within the TS decoder 1302. The extracted MPEG-2 section is DMA-transferred to the primary storage unit 1308.

The video PES and the audio PES inputted into the AV decoder 1303 are decoded and outputted as an audio signal and a video signal. After that, the audio signal and the video signal are inputted into the display 1305 and the speaker 1304, thus reproducing the audio and the video.

The MPEG-2 section inputted into the primary storage unit 1308 is inputted into the CPU 1306.

Thus far, an example of a hardware configuration regarding the present invention has been described. Hereafter, a chief function of the present invention, which is control of recording the service and trick-mode control, via a Java program, is described.

Recording of the service in the present invention refers to recording video, audio, a Java program, synchronization information of the Java program, and so on that are contained in the service, into a storage medium such as a hard disk, a Blu-ray Disc (BD), a Digital Versatile Disc (DVD), and a Secure Digital (SD) memory card. Reproduction of the service refers to execution and reproduction of the video, audio, and Java program recorded in the recording medium, based on the synchronization information. It is required that a reproduction result of a recorded service is almost equivalent to a result of directly reproducing the service upon receiving a broadcast wave.

Figure 17:
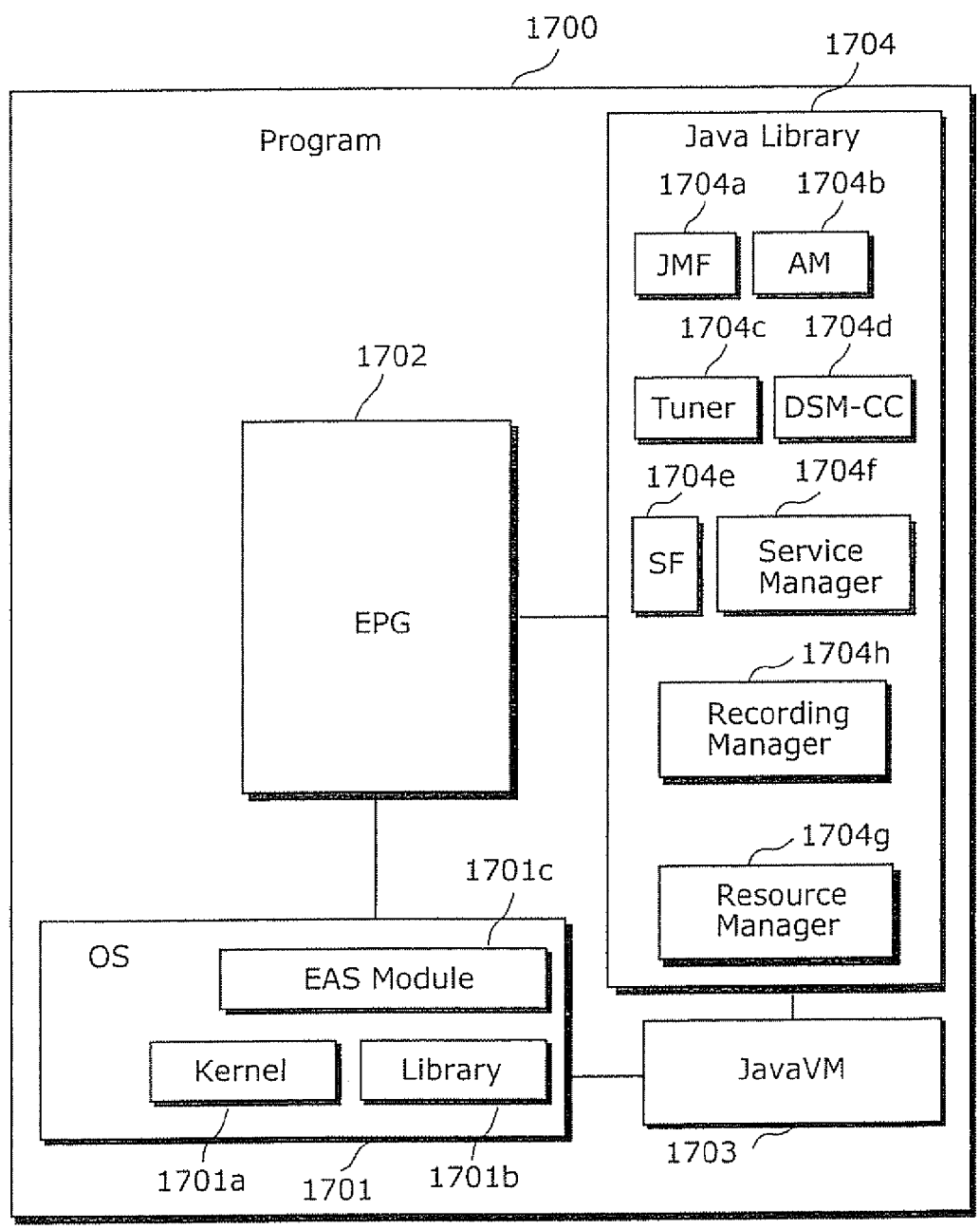
FIG. 17 is a diagram showing a structure of a program stored in a terminal apparatus according to the present invention.

FIG. 17 is a configuration diagram of a program necessary for recording and reproduction of the service, and is software recorded in the ROM 1309.

A program 1700 is configured of an OS 1701, an EPG 1702, a Java VM 1703, and a Java library 1704, which are sub-programs.

The OS 1701 is an Operating System; Linux, Windows, and the like are examples. The OS 1701 is configured of: a kernel 1701a for executing other sub-programs such as the EPG 1702 and the Java VM 1703; a library 1701b used by the sub-programs to control the constituent elements of the terminal apparatus 1300; and an EAS module 1701c. The kernel 1701a is publicly-known technology and therefore the detailed description is omitted.

The library 1701b provides, for example, a tuning function for controlling a tuner. The library 1701b accepts, from another sub-program, tuning information that can specify a frequency and a modulation scheme, and supplies the information to the tuner 1301. The tuner 1301 performs demodulation processing based on the provided tuning information, and can pass the demodulated MPEG-2 transport stream to the TS decoder 1302. As a result, other sub-programs can control the tuner 1301 through the library 1701b.

Also, the library 1701b provides channel information for uniquely identifying a channel. An example of the channel information is shown in FIG. 20. The channel information is sent using an OOB or an In-band frequency range, is converted into a chart format by the adapter 1311, and is stored in a temporary memory unit accessible by the library. A column 2001 is a channel identifier, and is equivalent to, for example, a source_ID as defined by SCTE65 Service Information Delivered Out-Of-Band For Digital Cable Television. A column 2002 is a channel name, and is equivalent to a source_name as defined by the same SCTE65 standard. A column 2003 is tuning information, and is information which can specify a frequency, a transfer rate, a modulation scheme, and the like that is given to the tuner 1301. A column 2004 is a program number for specifying the PMT. For example, a row 2011 is a group of service information with a channel identifier of "1", a channel name of "channel", a frequency of "150 MHz, ... " for the tuning information, and a program number of "101".

Figure 27:
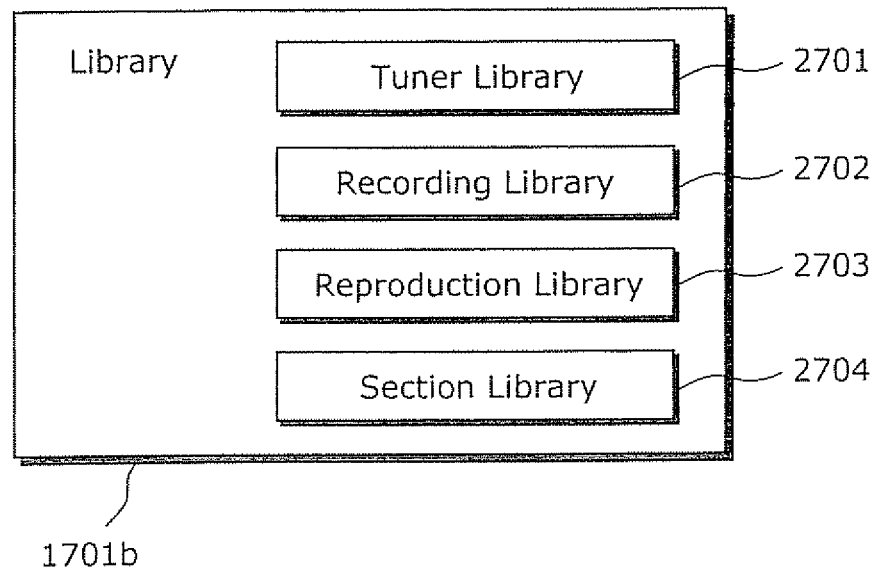
FIG. 27 is an example of a structure of a library according to the present invention.

FIG. 27 is a diagram showing a detailed structure of the library 1701b. With reference to FIG. 27, the library 1701b is configured of: a tuner library 2701; a recording library 2702; a reproduction library 2703; and a section library 2704.

The tuner library 2701 has a function for allowing a tuner to perform tuning at a specified frequency. The tuning information which includes a frequency and a tuner identifier are inputted from the Tuner 1704e of the Java library 1704 into the tuner library 2701. The tuner library 2701 specifies a tuner that corresponds to the inputted tuner identifier. The tuner library 2701 outputs the inputted tuning information to the specified tuner. The tuner library 2701 refers to the tuner information stored in the secondary storage unit 1307, and specifies a tuner that corresponds to the tuner identifier.

The recording library 2702 has a function for storing, into the secondary storage unit 1307, the MPEG-2 transport stream outputted from the tuner. The tuner identifier and information for specifying a recording area within the secondary storage unit 1307 are inputted from the recording manager 1706 into the recording library 2702. The recording library 2702 refers to the tuner information stored in the secondary storage unit 1307, and specifies the tuner indicated by the inputted tuner identifier. The recording library 2702 stores the MPEG-2 transport stream outputted by the specified tuner, into the inputted recording area within the secondary storage unit 1307.

The reproduction library 2703 reproduces the MPEG-2 transport stream recorded in the recording area within the secondary storage unit 1307. Information for specifying the recording area within the secondary storage unit 1307 is inputted from the service manager 1704 into the reproduction library 2703 via the JMF 1704a. The reproduction library 2703 outputs, to the TS decoder 1302, the MPEG-2 stream data stored in the inputted recording area within the secondary storage unit 1307. The reproduction library 2703 sends a command for reproducing AV to the AV decoder 1303.

Note that the recording library 2702 and the reproduction library 2703 are capable of simultaneously operating for the same recording area. With such simultaneous operation, it is possible to realize "time-shift playback" which allows the reproduction library 2703 to replay, from the head, the record data of a certain TV program during the recording operated by the recording library 2702. With such time-shift playback, it is possible for the user to view a TV show that is being recorded without waiting for the completion of the recording.

The section library 2704 outputs, to another sub-program, the data taken out for the filter processing performed by the TS decoder 1302. The packet ID which corresponds to the alert information is inputted from the EAS module 1701c to the Section library 2704. For example, in the case where the packet IDs of the MPEG-2 transport stream are assigned as shown in FIG. 6, the packet ID "400" is inputted from the EAS module 1701c to the section library 2704. The section library 2704 outputs the inputted packet ID to the TS decoder 1302. The section library 2704 outputs the alert information outputted by the TS decoder 1302, to the EAS module 1701c.

Figure 28:
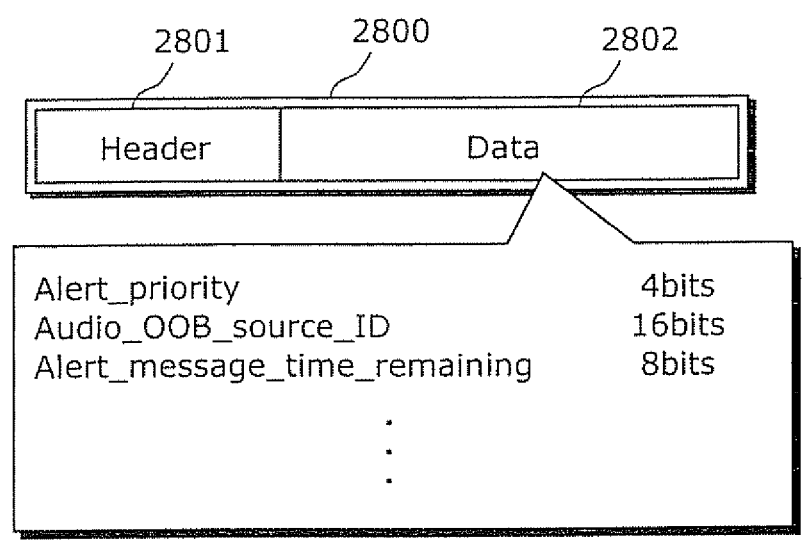
FIG. 28 is an example of a data format of alert information according to the present invention.

The EAS module 1701c has a function for interpreting the details of the alert information transmitted by the head-end 101. The EAS module 1701c outputs the packet ID which corresponds to the alert information to the section library 2704. The alert information is inputted from the section library 2704 to the EAS module 1701c. The alert information may be, for example, "cable_emergency_alert" defined by "SCTE 18 2002 (Formerly DVS208), Emergency Alert Message for Cable, approved as a joint standard with CEA as ANSI-042-2002" standard. FIG. 28 shows one example of a data format of the alert information. The alert information 2800 is made up of a header portion 2801 and a data portion 2802. The data portion includes values such as "Alert_priority" which indicates priority of alert, "Audio_OOB_source_ID" which indicates a channel identifier of a forced tuning destination, and "Alert_message_time_remainin" which indicates a valid time of the forced tuning.

The EAS module 1701c interprets the details of the inputted alert information, and judges whether or not a forced tuning is required. As a result of the judgment, in the case where a forced tuning is required, the EAS module 1701c outputs, to the service manager 1704f, the channel identifier of the forced tuning destination and the valid time of the forced tuning.

The Java VM 1703 is a Java virtual machine which sequentially analyzes and executes programs written in the Java™ language. Programs written in the Java language are compiled of intermediate code, called bytecode, which does not depend on the hardware. The Java virtual machine is an interpreter which executes this bytecode. The Java VM 1703 executes the Java library 1704 that is written in the Java language. Details of the Java language and the Java VM are explained in publications such as "Java Language Specification" (ISBN 0-201-63451-1) and "Java Virtual Machine Specification" (ISBN 0-201-63451-X). In addition, it is possible to call or be called by other sub-programs not written in the Java language through a Java Native Interface (JNI). Details regarding the JNI can be found in a publication "Java Native Interface" and so on.

The Java library 1704 is a library written in the Java language and is called by the lava program in order to control functions of the broadcast recording and reproduction apparatus. However, there are situations where a sub-program not written in the Java language, such as the library 1701b of the OS 1701, is used as necessary. The Java program can use a function provided by the Java library 1704 by calling a Java Application Programming Interface (API) held by the Java library 1704.

Figure 29:
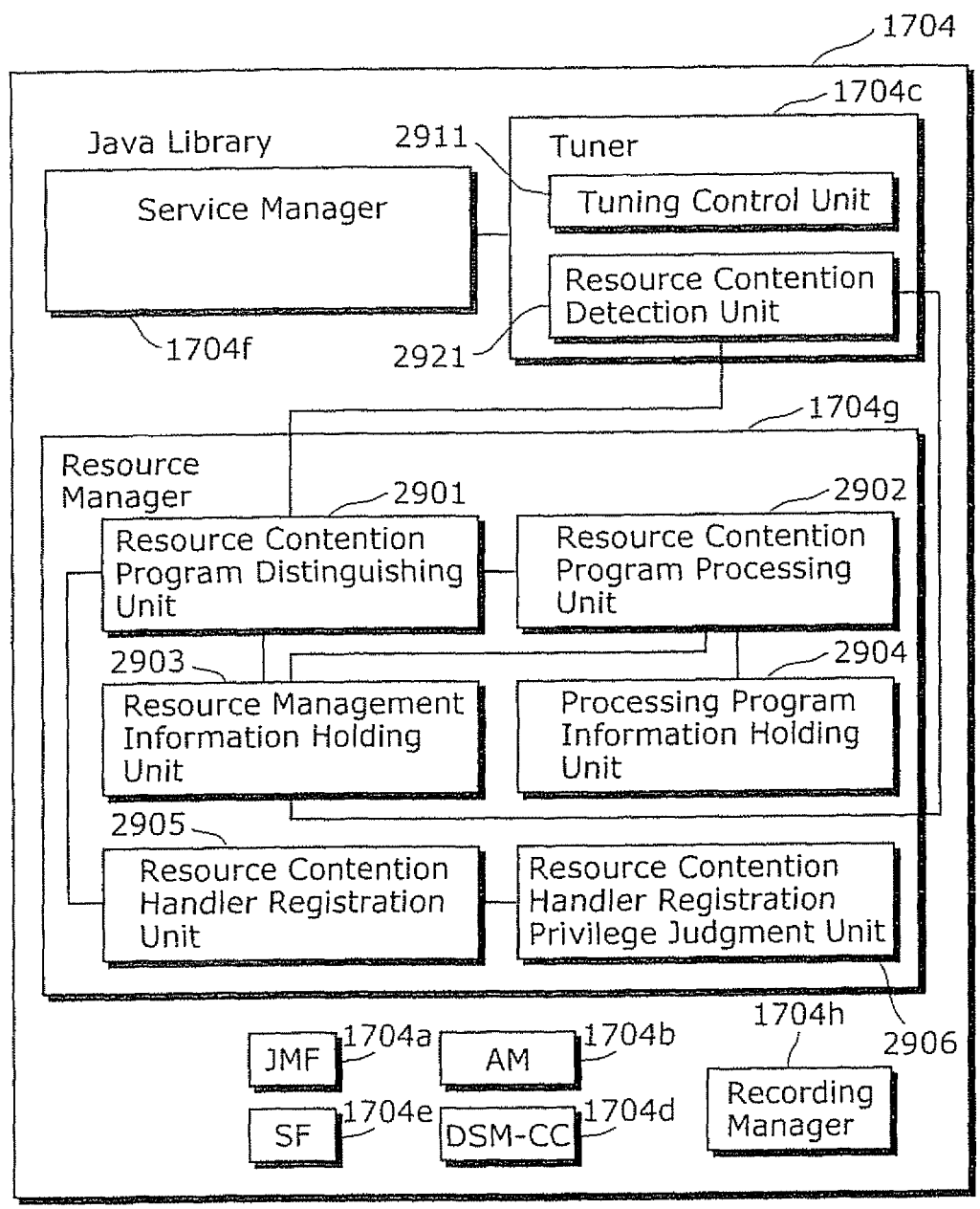
FIG. 29 is an example of a structure of a resource manager according to the present invention.

A Tuner 1704c is a Java library for controlling the In-band receiving tuner 1301a of the broadcast recording and reproduction terminal. FIG. 29 shows an internal structure of the Tuner 1704c.

The Tuner 1704c is configured of a tuning control unit 2911 and a resource contention detection unit 2921. The tuning control unit 2911 controls the In-band receiving tuner 1301a. When the Java program passes tuning information to the tuner 1704c, the tuning control unit 2911 uses that information to call a tuning function of the library 1701b, and as a result, it is possible to control an operation of the In-band receiving tuner 1301a of the broadcast recording and reproduction terminal. Here, the tuning information is information that can specify a frequency, a modulation scheme, and the like.

In the case where a reservation of a tuner hardware resource is requested, the resource contention detection unit 2921 detects a tuner resource contention with another program, and asks the resource contention program distinguishing unit 2901 in the resource manager 1704g to resolve the contention.

The resource contention detection unit 2921 has, as a Java API, a reserve (tuner identifier) method for requesting for a reservation of a tuner. The program calls out this method so as to request for a reservation of the tuner resource specified by a tuner identifier.

When the reserve method is called out, the resource contention detection unit 2921 refers to the resource management information held by the resource management information holding unit 2903, and examines whether or not the specified tuner has already been reserved. In the case where the tuner has already been reserved by one of the programs, the resource contention detection unit 2921 provides the resource contention program distinguishing unit 2901 within the resource manager 1704g with a resource identifier which identifies the tuner, a priority level that depends on the requester of the tuner, and a program identifier which identifies the requester of the tuner, so as to request the resource contention program distinguishing unit 2901 to resolve the contention of the tuner. Here, the request for a reservation of a resource such as a tuner is made by a downloaded Java program or a program that is previously incorporated into the terminal. Such Java program and terminal-incorporated program shall be both referred to as "program". In the case of the Java program, a Java program identifier is used as a program identifier, while in the case of the terminal-incorporated program, a program name is used as a program identifier. Also, in the case where the requester of the tuner is a forced tuning from the EAS module 1701c, the highest priority is given to that requester. In the case where the highest priority is given, a reservation of the resource requested by the program is permitted unconditionally. For example, in the case where a program that has a program identifier "EAS module" requests for a reservation of a tuner, "reserve (tuner)" is called, using a resource identifier "tuner" of the tuner to be reserved, as an argument, based on the Java method "reserve" provided for the Tuner 1704c for reserving a tuner. In such case, providing that another program has already reserved the tuner, the resource contention detection unit 2921 detects a resource contention as well as gives the resource identifier "tuner", the priority level "100" and the program identifier "EAS module", so as to request the resource manager 1704g to resolve the resource contention.

An SF 1704e is a Java library for controlling a function of the PID filter 1502 and the section filter 1503 of the broadcast recording and reproduction terminal. When the Java program passes filter conditions such as a PID, table_id, and the like to the SF 1704e, the SF 1704e controls the PID filter 1502 and the section filter 1503 using a function of the library 1701b based on such conditions, acquires an MPEG-2 section that fulfills desired filter conditions, and passes the MPEG-2 section to the Java program that set filter conditions.

A DSM-CC 1704d is a Java library for accessing a file system of a DSM-CC object carousel, The DSM-CC object carousel is included in the MPEG-2 section acquired by the SF 1704e. The DSM-CC is defined by the ISO/IEC13818-6 standard, and is a mechanism for sending an arbitrary file, using the MPEG-2 section. By using this system, it is possible to send a file from a broadcast station to a terminal. A detailed method for implementing the DSM-CC is of no relation to the present invention, and therefore details are omitted.

An AM 1704b is an application manager that provides a function for managing the execution and termination of the Java programs contained in the service. The AM 1704b extracts a Java program multiplexed onto a channel specified by a specified MPEG-2 transport stream, and causes the execution or termination of that extracted Java program in accordance with separately-multiplexed synchronization information. A Java class file of the Java program is multiplexed onto the MPEG-2 transport stream based on the aforementioned DSM-CC method. In addition, the synchronization information of the Java program is multiplexed onto the MPEG-2 transport stream in a format called AIT. AIT is an acronym of Application Information Table, as defined in chapter 10 of the DVB-MHP specification (ETSITS 101812 DVB-MHP specification V1.0.2), and is an MPEG-2 section with a table_id of "0x74".

FIG. 22 is a chart that schematically shows an example of the information in the AIT. An AIT version 2200 expresses the version of that AIT. The higher the version of the AIT, the newer the AIT is, AIT of the same AIT version are repeatedly received, but the AM 1704b does not analyze AIT with the same AIT version as an AIT that has already been analyzed, and only analyzes an AIT that is newer than the already-analyzed AIT. A column 2201 is an identifier of the Java program. A column 2202 is control information of the Java program. In the control information, there is "autostart", "present", "kill", and the like; "autostart" means that the terminal apparatus 1300 executes the Java program automatically in an instant, "present" means not performing automatic execution, and "kill" means stopping the Java program. A column 2203 is a DSM-CC identifier for extracting the PID that includes the Java program, based on the DSM-CC method. A column 2204 is a program name of the Java program. Rows 2211, 2212, 2213, and 2214 are groups of the information of the Java program. The Java program defined by row 2211 is a combination of a Java program identifier "301"; control information "autostart", a DSMCC identifier "1", and a program name "a/TopXlet". Similarly, the Java program defined in row 2212 is a combination of a Java program identifier "302", control information "present", a DSMCC identifier "1"; and a program name "b/GameXlet". Here, the three Java programs defined by rows 2211, 2212, and 2214 have the same DSMCC identifier. This indicates that three Java programs are included in one file system encoded based on the DSM-CC method. Here, four types of information are prescribed for the Java program, but in reality, more types of information are defined. Details can be found in the DVB-MHP specification.

The AM 1704b specifies the PID and the section filter conditions of the TS packet for sending the MPEG-2 section in which data is inserted, based on the DSMCC method. Here, the packet ID "5014" is provided. As a result, the AM 1704b can collect necessary DSMCC MPEG-2 sections. The AM 1704b reconstructs the file system from the collected MPEG-2 sections according to the DSMCC method, and stores the reconstructed file system into the primary storage unit 1308. Fetching data such as the file system from the TS packet in the MPEG-2 transport stream and saving the data into a storage means such as the primary storage unit 1308 and the secondary storage unit 1307 is hereafter called downloading.

Figure 23:
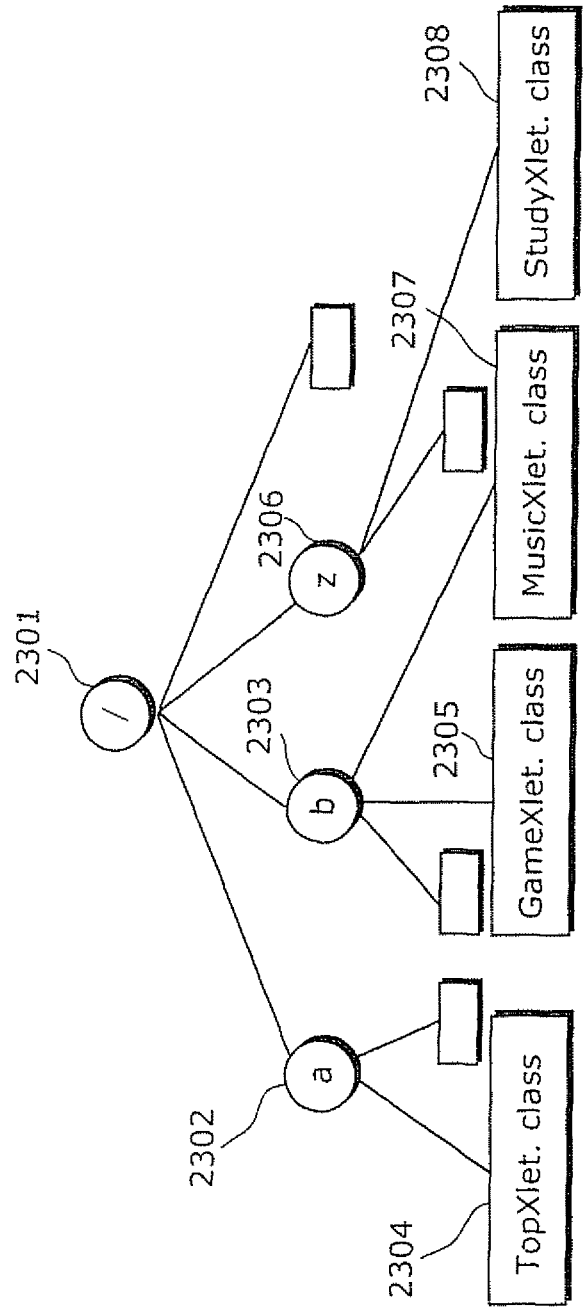
FIG. 23 is a schematic diagram showing a file system sent in DSMCC format according to the present invention.

FIG. 23 is an example of a downloaded file system. In the diagram, a circle represents a directory and a square represents a file. 2301 is a root directory, 2302 is a directory "a", 2303 is a directory "b", 2304 is a file "TopXlet.class", 2305 is a file "GameXlet.class", 2306 is a directory "z", 2307 is a file "MusicXlet.class", and 2308 is a file "StudyXlet.class".

Subsequently, the AM 1704b passes, to the lava VM 1703, a Java program to be executed out of the file system downloaded into the primary storage unit 1308. Here, assuming that the lava program name to be executed is "a/TopXlet", a file "a/TopXlet.class", resulting from the appendage of ".class" to the above lava program name, is a file to be executed. "/" is a division between the directories and between the file names, and the file 2304 is the Java program which should be executed with reference to FIG. 23. Then, after the AM 1704*b* passes the file 2304 to the lava VM 1703, the file is executed as a Java program in the lava VM.

Every time an AIT with the new AIT version is inputted, the AM 1704*b* analyzes the AIT and changes the execution status of the lava program. Here, in the case where "kill" is specified for the control information, the AM 1704*b* terminates the Java program.

A JMF 1704*a* handles control of reproduction of the video and audio contained in the service. To be more concrete, the JMF 1704*a* inputs the video ES and audio ES multiplexed onto the channel specified by the specified MPEG-2 transport stream into the AV decoder, so that the AV decoder reproduces them. In the case of reproducing the service directly from the received broadcast wave, it is specified that the MPEG-2 transport stream outputted from the adapter 1311 should be reproduced. In the case of reproducing the service that is once recorded into the secondary storage unit 1307, it is specified that the MPEG-2 transport stream outputted from the recording area 1504 within the secondary storage unit 1307 should be reproduced.

First, the JMF 1704*a* searches for channel information in the library 1701*b* with a specified channel identifier as a key, and obtains the program number. Next, using the SF 1704*e* and the like, the PAT is acquired from the MPEG-2 transport stream. Then, the PID of a PMT that corresponds to the obtained program number is acquired from the information of the PMT. Using again the SF 1704*e*, the actual PMT is acquired. The acquired PMT is in the format as shown in FIG. 11, and the PIDs of elementary streams that have "video" and "audio" as stream types are written therein. When the JMF 1704*a* sets those PIDs in the PID filter 1502 of the TS decoder 1302, the video ES and the audio ES, onto which those PIDs are multiplexed, are reproduced via the AV decoder 1303, as shown in FIG. 15 or FIG. 16.

In the particular case where the JMF 1704*a* inputs the MPEG-2 transport stream which is already recorded in the secondary storage unit, the JMF 1704*a* can change the reproduction speed of the video and audio by changing the speed and position of reading out the MPEG-2 transport stream. Thus, it is possible to perform trick play such as fast-forward and skip. For example, in the case where the MPEG-2 transport stream is read out at the speed twice as fast as the normal speed, the video and audio are also reproduced at the speed twice as fast as the normal speed. In the case where the position of reading out the MPEG-2 transport stream is read out after a predetermined interval is skipped, the video and audio will be reproduced with such skip mode operation. The JMF 1704*a* controls the secondary storage unit 1307 using the functions of the library 1701*b*, and changes the speed and position of reading out the MPEG-2 transport stream. The method of performing such trick play in a high level deviates from the scope of the present invention, therefore, descriptions are omitted. In order that the Java program instructs on trick play, the JMF 1704*a* provides the Java program with, for example, an API called setRate (float factor). When the parameter factor is specified to be 1.0, reproduction is performed at the normal speed, whereas when the parameter factor is specified to be 2.0, trick play with the speed twice as fast as the normal speed will be performed.

Having the channel identifier, start time, and end time inputted as inputs, the recording manager 1704*h* records the service into the secondary storage unit 1307, only for the period of time between the start time and the end time which are specified. For example, when the channel identifier, start time, and end time are specified by the EPG 1702, the recording manager 1704*h* waits until the start time is reached. Then, when the start time is reached, the recording manager 1704*h* starts recording the specified service, and when the end time is reached, the recording manager 1704*h* terminates the recording. The details will be described below.

When the recording start time is reached, the recording manager 1704*h* firstly secures, within the secondary storage unit 1307, a recording area 1504 for recording the MPEG-2 transport stream from the specified start time to the specified end time. A media identifier is supplied to the reserved recording area. Next, with the channel identifier as a key, the recording manager 1704*h* obtains tuning information that corresponds to the channel identifier, from the channel information held by the library 1701*b*. After that, when the tuning information is supplied to the Tuner 1704*c*, the Tuner 1704*c* commences tuning. Here, the tuning information is information that can specify a frequency, a modulation method, and the like. Then, as shown in FIG. 15, the MPEG-2 transport stream is inputted into the TS decoder via the adapter 1311, Next, using the SF 1704*e*, the recording manager 1704*h* acquires the PAT from the MPEG-2 transport stream obtained through the tuning. In addition, the recording manager 1704*h* searches for the program number that corresponds to the specified channel identifier in the library 1701*b*, and searches for the PID of the corresponding PMT in the PAT. After that, using the SF 1704*e*, the recording manager 1704*h* acquires an actual PMT, and obtains all the PIDs of the ESs which constitute the specified channel. The recording manager 1704*h* sets the obtained PIDs in the PID filter 1502 of the TS decoder. Moreover, an output destination of each hardware constituent element is set through the library 1701*b* so as to follow the operation of recording the service included in the broadcast wave into the secondary storage unit 1307. Then, in accordance with the flow described in FIG. 15, all of the ESs that make up a desired channel are recorded into the reserved recording area 1504.

After that, when the specified end time is reached, the recording manager 1704*h* stops the tuning operation of the Tuner 1704*c*, and causes the writing of the MPEG-2 transport stream into the recording area 1504 to end. In addition, a record information management table as shown in FIG. 21 is created as management information of the MPEG-2 transport stream recorded earlier.

FIG. 21 is an example of the record information management table for managing the record information recorded into the recording area 1504 of the secondary storage unit 1307 or the like. The record information is recorded in chart format. A column 2101 indicates a record identifier. A column 2102 describes channel identifiers A column 2103 indicates a program number. A column 2104 is the record start time for the service, and a column 2105 is the record end time for the service. A column 2106 is a media identifier which identifies the MPEG-2 transport stream that is recorded as the service. Each of rows 2111 and 2112 is a group made up of a record identifier, a channel identifier, a program number, a start time, an end time, and a media identifier. For example, row 2111 shows a record identifier of "000", a channel identifier of "2", a program number of "102", a start time of "2005 Mar. 30 11:00", an end time of "2005 Mar. 30 12:00", and a media identifier of "TS_001".

A service manager 1704*f* manages reproduction of the service within the MPEG-2 transport stream that has been recorded into the secondary storage unit 1307, or the service within the MPEG-2 transport stream inputted from the adapter 1311.

Hereafter, an operation in the case of managing reproduction of the service contained in the MPEG-2 transport stream that has already been recorded in the secondary storage unit 1307 is described. This is equivalent to reproduction of an already-recorded service. In this case, the service manager 1704*f* has the record identifier as an input. The service which is already recorded in the secondary storage unit 1307 and is specified by that record identifier is to be reproduced.

First, referring to the record information management table created by the recording manager 1704*h*, the service manager 1704*f* obtains the channel identifier and the media identifier of the channel to be reproduced, with the specified record identifier. Then, through the library 1701*b*, the service manager 1704*f* instructs the secondary storage unit 1307 to output, to the TS decoder 1302, the MPEG-2 transport stream specified by the obtained media identifier. In addition, through the library 1701*b*, the service manager 1704*f* sets the output destination of each hardware constituent element to flow through the path shown in FIG. 16. After that, the secondary storage unit 1307 is provided to the JMF 1704*a* as the location of the MPEG-2 transport stream, and the channel identifier of the channel to be reproduced is provided. Then, through the operation described above, the JMF 1704*a* starts reproduction of the audio and video multiplexed onto the MPEG-2 transport stream outputted from the secondary storage unit 1307. After that, the secondary storage unit 1307 is provided to the JMF 1704*a* as the location of the MPEG-2 transport stream, and the channel identifier of the channel to be reproduced is provided. Then, in accordance with the AIT multiplexed onto the MPEG-2 transport stream outputted from the secondary storage unit 1307, the AM 1704*b* commences execution and termination of the Java program multiplexed onto the MPEG-2 transport stream outputted from the secondary storage unit 1307. After that, reproduction of the service is continued until the end of the MPEG-2 transport stream outputted from the secondary storage unit 1307.

On the other hand, the case of managing reproduction of the service within the MPEG-2 transport stream inputted from the adapter 1311 is described hereafter. This is equivalent to reproduction of the service directly from the broadcast wave. In this case, the service manager 1704*f* has the channel identifier of the service to be reproduced as the input.

Through the library 1701*b*, the service manager 1704*f* instructs the MPEG-2 transport stream outputted from the adapter 1311 shown in FIG. 15 to be outputted to the TS decoder 1302. In addition, through the library 1701*b*, the service manager 1704*f* sets the output destination of each hardware constituent element to flow through the path shown in FIG. 16. After that, the adapter 1311 is provided to the JMF 1704*a* as the location of the MPEG-2 transport stream, and the channel identifier of the channel to be reproduced is provided. Then, through the operation described above, the JMF 1704*a* starts reproduction of the audio and video multiplexed onto the MPEG-2 transport stream outputted from the adapter 1311. Furthermore, the adapter 1311 is provided to the AM 1704*b* as the location of the MPEG-2 transport stream, and the channel identifier of the channel to be reproduced is provided. Then, in accordance with the AIT multiplexed onto the MPEG-2 transport stream outputted from the adapter 1311, the AM 1704*b* commences execution and termination of the Java program multiplexed onto the MPEG-2 transport stream outputted from the secondary storage unit 1307. After that, reproduction of the service is continued until the end of the MPEG-2 transport stream outputted from the secondary storage unit 1307.

FIG. 29 is a diagram showing detailed structures of the service manager 1704*f*, the Tuner 1704*c* and the resource manager 1704*g* in the Java library 1704.

In the case where a resource such as a tuner is requested to be reserved, the resource manager 1704*g* invokes a resource contention handler registered by a privileged Java program, or resolves a resource contention based on the priority level of the program with reference to the resource management information, so as to provide an appropriate program with a resource that is requested to be reserved.

The resource manager 1704*g* is configured of a resource contention program distinguishing unit 2901, a resource contention program processing unit 2902, a resource management information holding unit 2903, an end program information holding unit 2904, a resource contention handler registration unit 2905 and a resource contention handler registration privilege judgment unit 2906.

In the case where the Tuner 1704*c* or the like requests for a reservation of a resource such as a tuner, the resource contention program distinguishing unit 2901 invokes the resource contention handler which is registered in the resource contention handler registration unit 2905 by a privileged Java program, or resolves a resource contention based on the priority level of the program with reference to the resource management information held in the resource management information holding unit 2903, and notifies the resource contention program processing unit 2902 of the program which permits the reservation of the requested resource.

The resource program processing unit 2902 notifies the program permitted to reserve the resource by the resource contention program distinguishing unit 2901 of the reservation of the resource. For the notification to the program that the tuner is reserved, for example, "notifyReserve (tuner)" is called using a resource identifier "tuner", as an argument, for which the reserve is permitted, based on the Java method "notifyReserve" for notifying that a resource is reserved.

Also, the resource contention program processing unit 2902 notifies the program forced to release the resource by the resource contention program distinguishing unit 2901 of the release of the resource. For the notification to the program that the tuner is released, for example, "notifyRelease (tuner)" is called using a resource identifier "tuner", as an argument, for which the release is forced, based on the Java method "notifyRelease" for notifying that a resource is released. Note that the notifyReserve method and the notifyRelease method are call back functions to the program which has requested the reservation of a resource.

In addition, the resource contention program processing unit 2902 updates, based on the result, the resource management information held in the resource management information holding unit 2903 and the processing program information held in the processing program information holding unit 2904.

Figure 34:
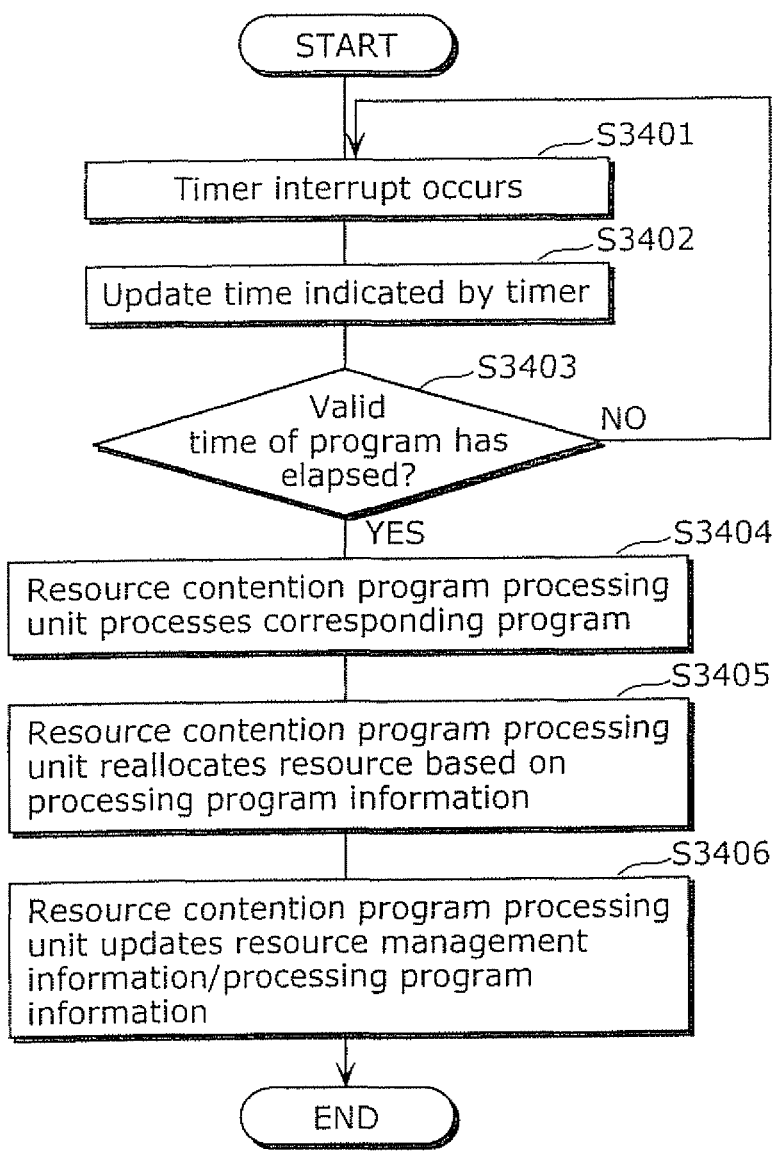
FIG. 34 is a flowchart for reallocating a resource when a forced tuning is terminated, according to the present invention.

In the case where the program which seizes the resource has a valid time, the resource contention program processing unit 2902 has a function for measuring an execution time of the program with a timer, and reallocating the resource to the program from which the resource is seized, after the valid time has passed. FIG. 34 is a flowchart showing the case of reallocating the resource to the program from which the resource is seized after the valid time of the program which seizes the resource passes. In the case where the program which seizes the resource has a valid time, the resource contention program processing unit 2902 holds that valid time. In the resource contention program processing unit 2902, a timer interrupt occurs at predetermined intervals (S3401), and the time indicated by the timer is updated (S3402). For example, when a program having a certain valid time is activated, the timer is reset and a timer interrupt occurs every 0.1 second. When the timer interrupt occurs, the time indicated at that time is updated to advance 0.1 second. In the case where the time indicated by the timer corresponds to the valid time of the program which has seized the resource (S3403), the resource contention program processing unit 2902 seizes the resource allocated for that program, and notifies the program that the resource is seized by calling the notifyRelease method (S3404), as well as reallocates, by the reserve method, a resource to the program which had been reserving that resource before the program has seized it, with reference to the processing program information held in the processing program information holding unit 2904 (S3405). In addition, the resource contention program distinguishing unit 2901 updates, based on the result, the resource management information held in the resource management information holding unit 2903 and the processing program information held in the processing program information holding unit 2904 (S3406).

The resource management information holding unit 2903 holds the resource management information which associates a resource such as a tuner and an AV encoder, a program which has been reserving the resource, and a priority level of the program with one another.

The processing program information holding unit 2904 holds processing program information which associates the program from which the reserving resource was seized by the resource contention program processing unit 2902, with the seized resource.

The resource contention handler registration unit 2905 holds a resource contention handler for resolving a contention between the resources, which has already been registered by a privileged Java program and is invoked in the case where a reservation of a resource such as a tuner and an AV encoder is requested.

In the case where a certain Java program attempts to register a resource contention handler, the resource contention handler registration privilege judgment unit 2906 judges whether or not the Java program has a privilege necessary for registering a resource contention handler. In the case where the Java program is a Java program that has such privilege, the resource contention handler is held in the resource contention handler registration unit 2905. For example, in order for a certain Java program to register a resource contention handler "rcHandler" into the resource contention handler registration unit 2905, "setResourceContentionHandler (rcHandler)" is called by the Java method "setResourceContentionHandler" for registering a resource contention handler Here, an array "appID[ ]" of the program identifiers which correspond to programs can be taken as an example of an argument of the resource contention handler "rcHandler". When "rcHandler (appID[ ])" is invoked, the return value may be, for example, an array "prioritizedAppID[ ]" of the program identifiers that are sorted in the order of priority.

FIG. 30 is a diagram showing an example of the resource management information held by the resource management information holding unit 2903. A reserved resource 3011 indicates a resource identifier which identifies a resource reserved by a program or the like, a program 3012 indicates a program which reserves that resource, and a priority 3013 indicates how much priority is given to the reservation of that resource. Here, a program executed in the OS 1701 or a Java program executed in the Java VM 103 may be taken as an example of such program. For example, row 3001 indicates that a resource "tuner" is reserved with a priority level "20" by a program "module A". In the present embodiment, the highest value of priority shall be "100". In the case where the EAS module 1701c reserves a resource through a forced tuning, the priority level is forcedly set to the highest, that is, FIG. 31 is a diagram showing an example of the processing program information held by the processing program information holding unit 2904. A seized resource 3111 indicates a resource identifier which identifies a resource that has been seized through the resolution of the resource contention, whereas a program 3112 indicates a program identifier which identifies a program from which a reserving resource has been seized. Here, a program executed in the OS 1701 or a Java program executed in the Java VM 103 is taken as an example of such program. For example, row 3101 indicates that a resource "tuner" is seized from a program "program C".

The EPG 1702 is an Electric Program Guide, and is a function which lets a user choose a TV show to be recorded and reproduced. Normal reproduction after receiving a broadcast wave deviates from the scope of the present invention and thus descriptions are omitted.

Figure 19:
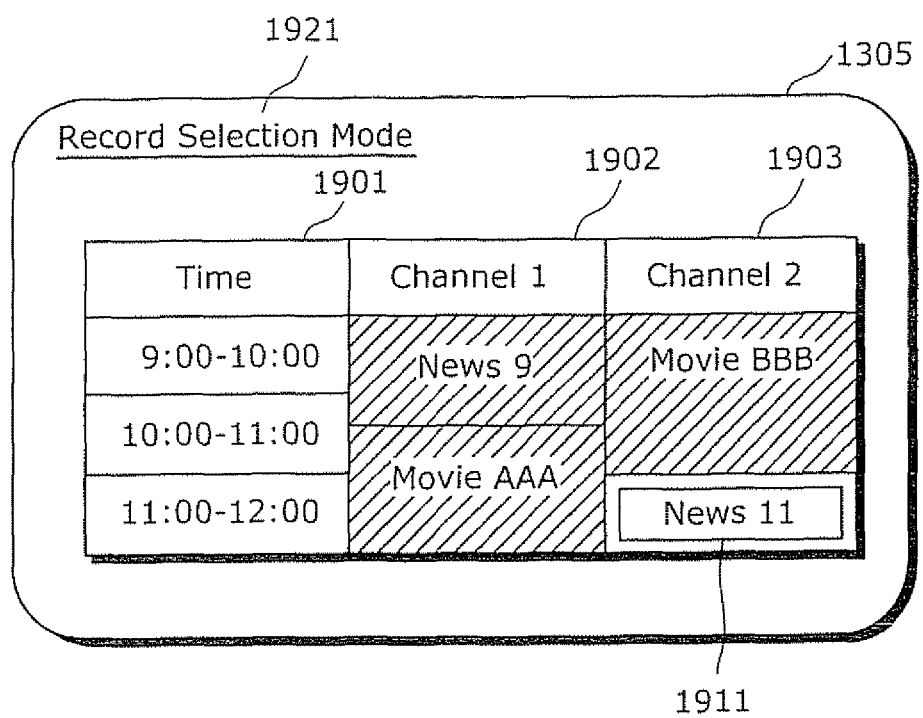
FIG. 19 is an example of an EPG executed by a terminal apparatus according to the present invention.

In the case of recording a TV show, the EPG 1702 displays a list of broadcasted TV shows, and lets the user choose a desired TV show. FIG. 19 is an example of a screen display for letting the user select a TV show to be recorded. A time 1901 and channels 1902 and 1903 are displayed in a grid, and it is possible to check the TV shows of each channel that is recordable at each time. It is possible for the user to move a focus 1911 within the screen by using top, bottom, right, and left cursor buttons 1401 to 1404 which are included in the input unit 1310 of the terminal apparatus 1300. Furthermore, when an OK button 1405 is pushed, the TV show which is currently highlighted is selected to be recorded The EPG 1702 acquires the channel identifier of the TV show from the library, and when the TV show to be recorded is selected by the user, notifies the channel identifier, start time, and end time of the TV show to the recording manager 1704h. Based on that information, the recording manager 1704h records the TV show into the secondary storage unit 1307.

Figure 18:
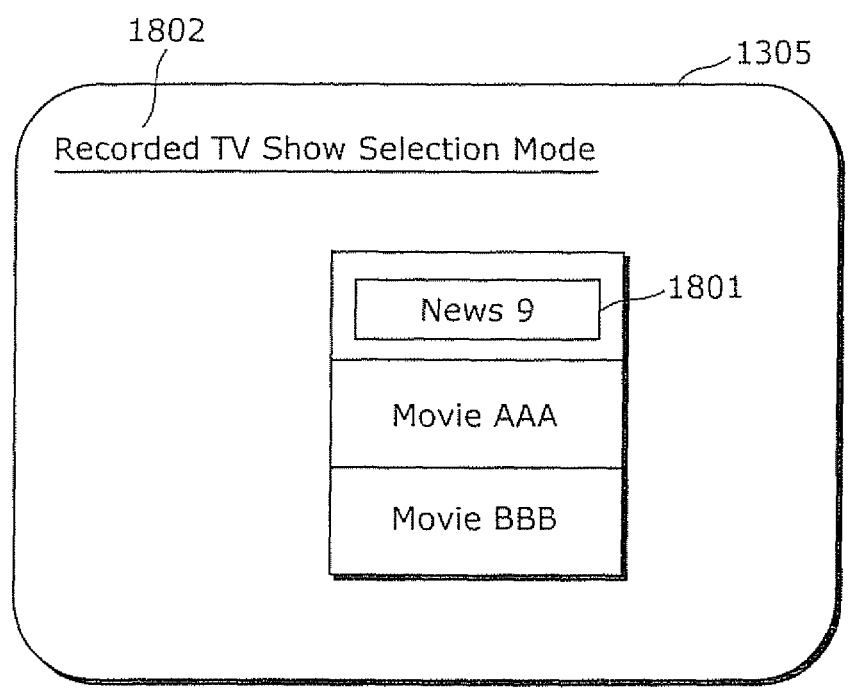
FIG. 18 is an example of an EPG executed by a terminal apparatus according to the present invention.

On the other hand, in the case of reproducing an already-recorded TV show, the EPG 1702 displays a list of the already-recorded TV shows, and lets the user choose a desired TV show. FIG. 18 is an example of a screen display for causing selection of an already-recorded TV show. All TV shows stored in the secondary storage unit 1307 at that point in time are listed. It is possible for the user to move a focus 1801 within the screen by using the top and bottom cursor buttons 1401 and 1402, which are included in the input unit 1310 of the terminal apparatus 1300. Furthermore, when the OK button 1405 is pushed, the TV show which is currently highlighted is selected to be reproduced. The EPG 1702 acquires the record identifier of the TV show from recording manager 1704h, and when the TV show to be reproduced is selected by the user, notifies the service manager 1704f of the record identifier of that TV show. Based on that information, the service manager 1704f reads out the TV show from the secondary storage unit 1307 and reproduces it.

The operation characteristic to the present embodiment applying the configuration as described above will be described below with reference to a flowchart.

Figure 32:
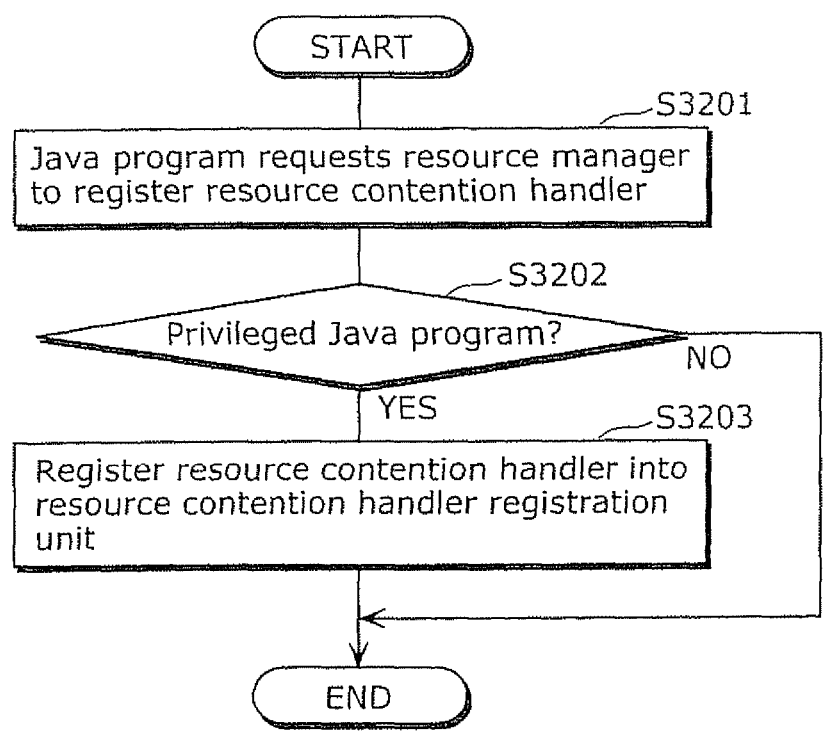
FIG. 32 is a flowchart for registering a resource contention handler, according to the present invention.

FIG. 32 is a flowchart showing the case where a certain Java program registers a resource contention handler into the resource contention handler registration unit 2905 in the resource manager 1704g.

The Java program attempting to register a resource contention handler requests the resource manager 1704g to register the resource contention handler (S3201). The resource manager 1704g, having received the request for the registration of the resource contention handler, judges, in the resource contention handler registration privilege judgment unit 2906, whether the Java program has a privilege necessary for registering the resource contention handler (S3202). In the case of judging that the Java program has a privilege necessary for registering the resource contention handler, the resource contention handler requested by the Java program is registered into the resource contention handler registration unit 2905 (S3203).

Figure 33:
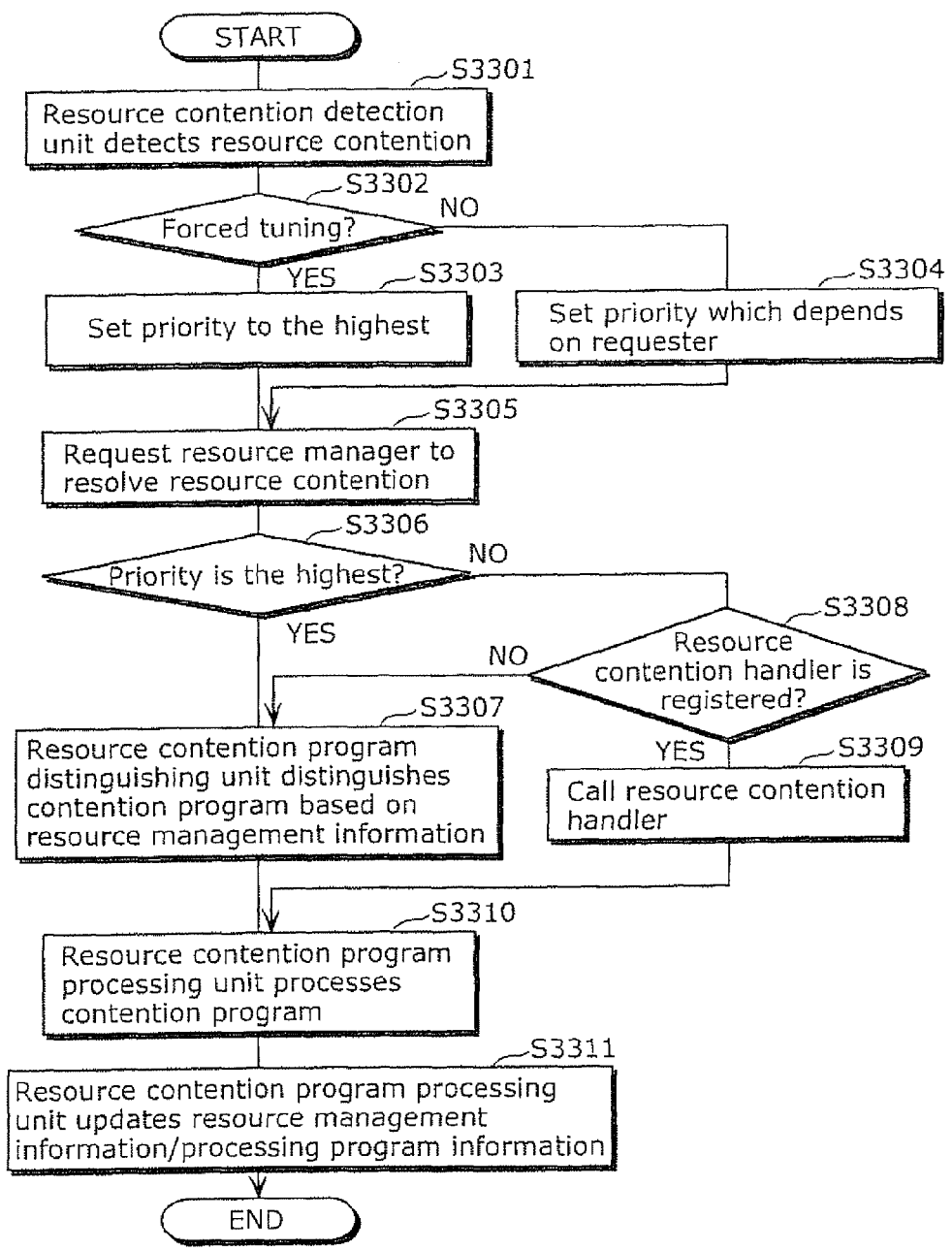
FIG. 33 is a flowchart for resolving a resource contention when a forced tuning occurs, according to the present invention.

FIG. 33 is a flowchart showing how a contention between resources such as tuners is resolved in the case where a forced tuning is caused by the EAS module 1701c.

When the EAS module 1701c causes a forced tuning, the EAS module 1701c outputs a channel identifier and a valid time of the forced tuning, to the service manager 1704f. Next, with the channel identifier as a key, the service manager 1704f obtains tuning information that corresponds to the channel identifier, from channel information held by the library 1701b. After that, the tuning information is supplied to the Tuner 1704c, the Tuner 1704c commences tuning. Here, the tuning information is information that can specify a frequency, a modulation method, and the like. In the case where the resource contention detection unit 2921 in the Tuner 1704c detects a resource contention between a forced tuning and a service that is already executed, whether or not a service to be executed attributes to the forced tuning is judged (S3302). In the case where it is judged that the service attributes to the forced tuning, the priority level is forcedly set to the highest "100" (S3303). In the case otherwise, an appropriate value is set for the priority level depending on the requester of the service (S3304). Either of the value being set, the resource contention detection unit 2921 passes, to the resource manager 1704g, a priority level that is set, a resource identifier which identifies the tuner in contention, and a program identifier which identifies the requester of the tuner, and requests the resource manager 1704g to resolve the resource contention (S3305). In the resource manager 1704g, in the case where the passed priority is the highest (S3306), the resource contention program distinguishing unit 2901 refers to the resource management information held in the resource management information holding unit 2903, and distinguishes the contention program which reserves the resource (S3307). The resource contention program distinguishing unit 2901 then passes the program identifier which identifies the distinguished contention program to the resource contention program processing unit 2902, seizes a resource in contention from that contention program, and notifies the contention program that the resource is seized as well as notifies the requester program that the seized resource is reserved (S3310). Moreover, the resource contention program distinguishing unit 2901 updates, based on the result, the resource management information held in the resource management information holding unit 2903 and the processing program information held in the processing program information holding unit 2904 (S3311). In the case where the passed priority is not the highest in S3306, the resource contention program distinguishing unit 2901 judges if the resource contention handler registration unit 2905 has the resource contention handler that has been registered by a privileged Java program (S3308). In the case where such resource contention handler is registered, the resource contention handler registration unit 2905 invokes the resource contention handler so as to consign the resolution of the resource contention to the resource contention handler (S3309). In the case where such resource contention handler is not registered, the resource contention program distinguishing unit 2901 refers to the resource management information held in the resource management information holding unit 2903, and distinguishes the contention program which reserves that resource (S3307). In the case where the priority level corresponding to the distinguished contention program is compared with the priority level corresponding to the requester program, and as a result, the latter is higher, the resource contention program distinguishing unit 2901 passes a program identifier which identifies that contention program to the resource contention program processing unit 2902, seizes a resource in contention from the contention program and notifies the contention program that the resource is seized as well as notifies the requester program that the seized resource is reserved (S3310). In addition, the resource contention program distinguishing unit 2901 updates, based on the result, the resource management information held in the resource management information holding unit 2903 and the processing program information held in the processing program information holding unit 2904 (S3311). In S3311, a program identifier which identifies the program that is deprived of the resource by the program in contention and a resource identifier which identifies that resource are held, as the processing program information, in an associated manner in the processing program information holding unit 2904.

As described above, even in the case where a forced tuning is caused by the EAS module 1701c, the service manager 1704f sets the priority level by the requester of the resource, and also, the resource contention program distinguishing unit 2901 permits the program with the highest priority level to forcedly reserve the resource with priority over other programs without invoking a resource contention handler. Thus, it is possible to rapidly execute a forced tuning so as to notify the user of an alert, without destroying the conventional framework for solving the problem of resource contention and without unexpected blocking upon invoking a resource contention handler which is already registered by a privileged Java program.

(Second Embodiment)

Hereafter, the broadcast receiving terminal and the program execution method according to the second embodiment of the present invention are described with reference to the drawings.

The second embodiment provides an embodiment of a different hardware configuration for realizing the first embodiment described above. The hardware configuration and the like used in is the second embodiment are shown in FIGS. 24 and 25.

Figure 24:
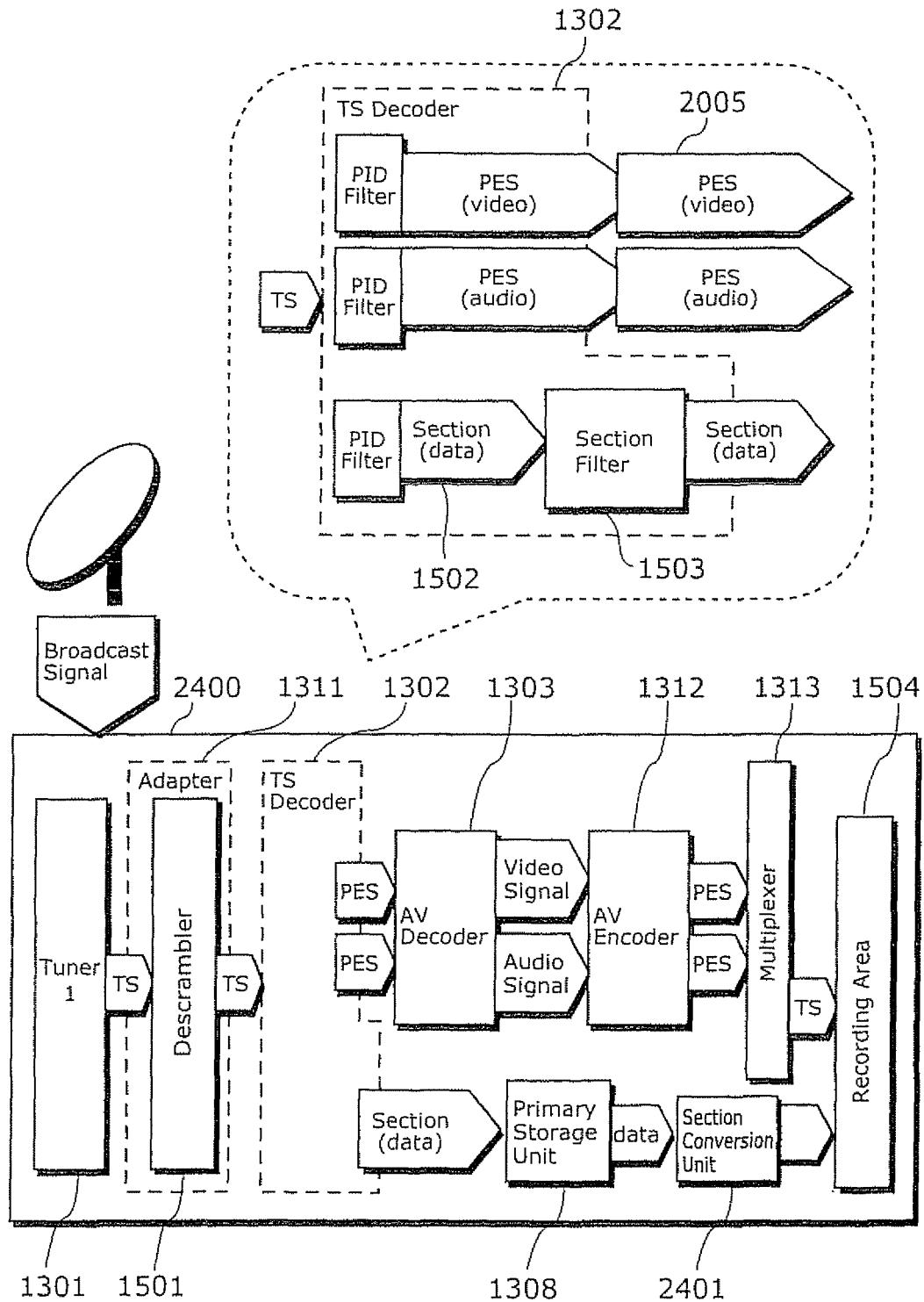
FIG. 24 is an example of a device connection at the time of recording, in the recording and reproduction apparatus according to the present invention.
Figure 25:
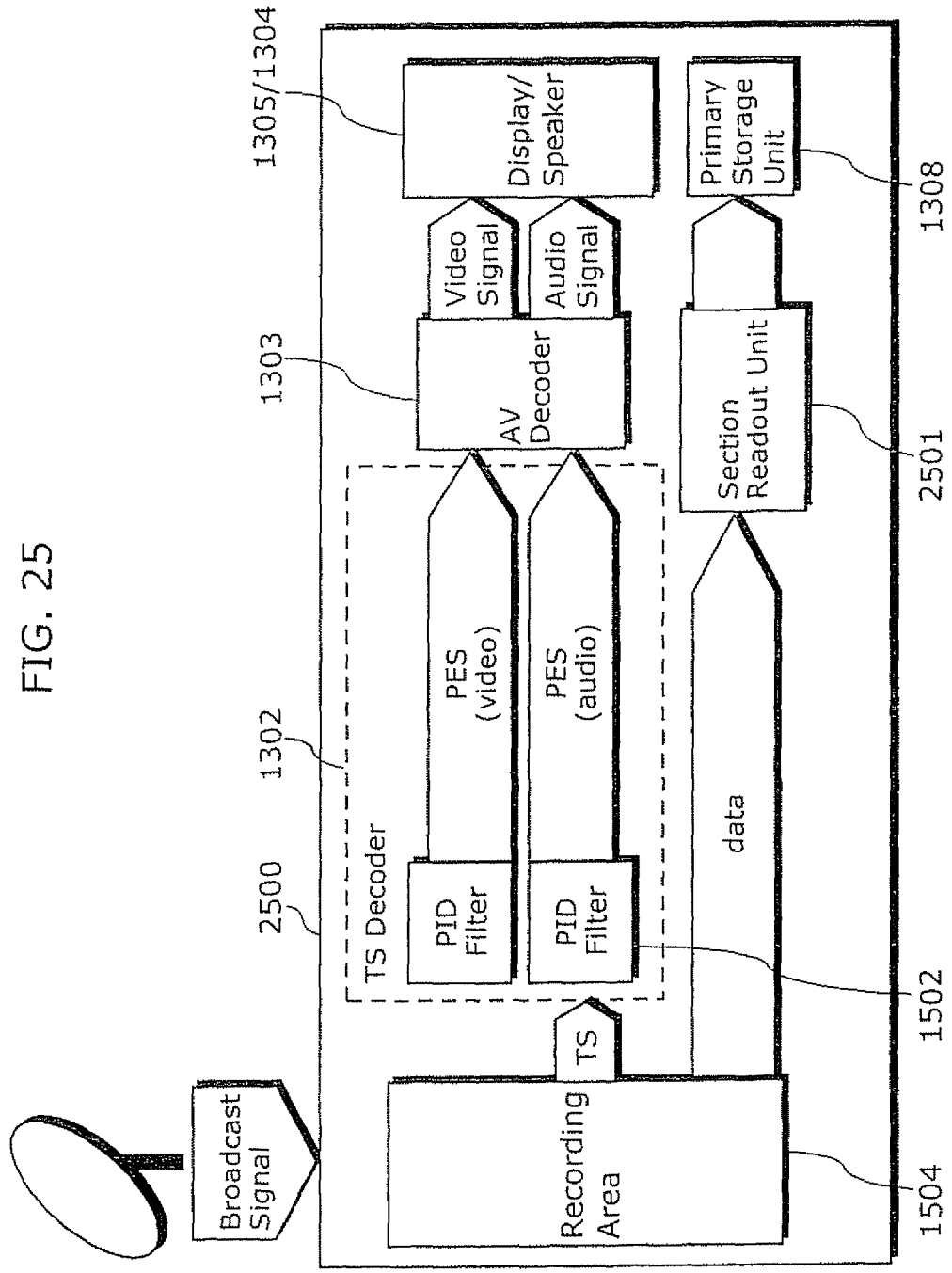
FIG. 25 is an example of a device connection at the time of reproduction, in the recording and reproduction apparatus according to the present invention.

FIG. 24 shows a conceptual rendering which represents the physical connection sequence, processing details, and input/output data format of each device during recording of the service. Constituent elements in the figure that have identical numbers to the constituent elements shown in FIG. 15 have already been described in the first embodiment, and therefore descriptions are omitted. As opposed to FIG. 15, with the hardware configuration shown in FIG. 24, after passing through the primary storage unit 1308, the section that is filtered by the TS decoder 1302 is recorded into the recording area 1504 without going through the multiplexer. Here, a recording method when recording the section into the recording area 1504 differs depending on a format of the section.

In the case of a file system recorded within an MPEG-2 transport stream in a DSMCC file system, the file system is converted into a file system format unique to the recording area 1504, which is in turn unique to a terminal, and records the file system into the recording area 1504.

Figure 26:
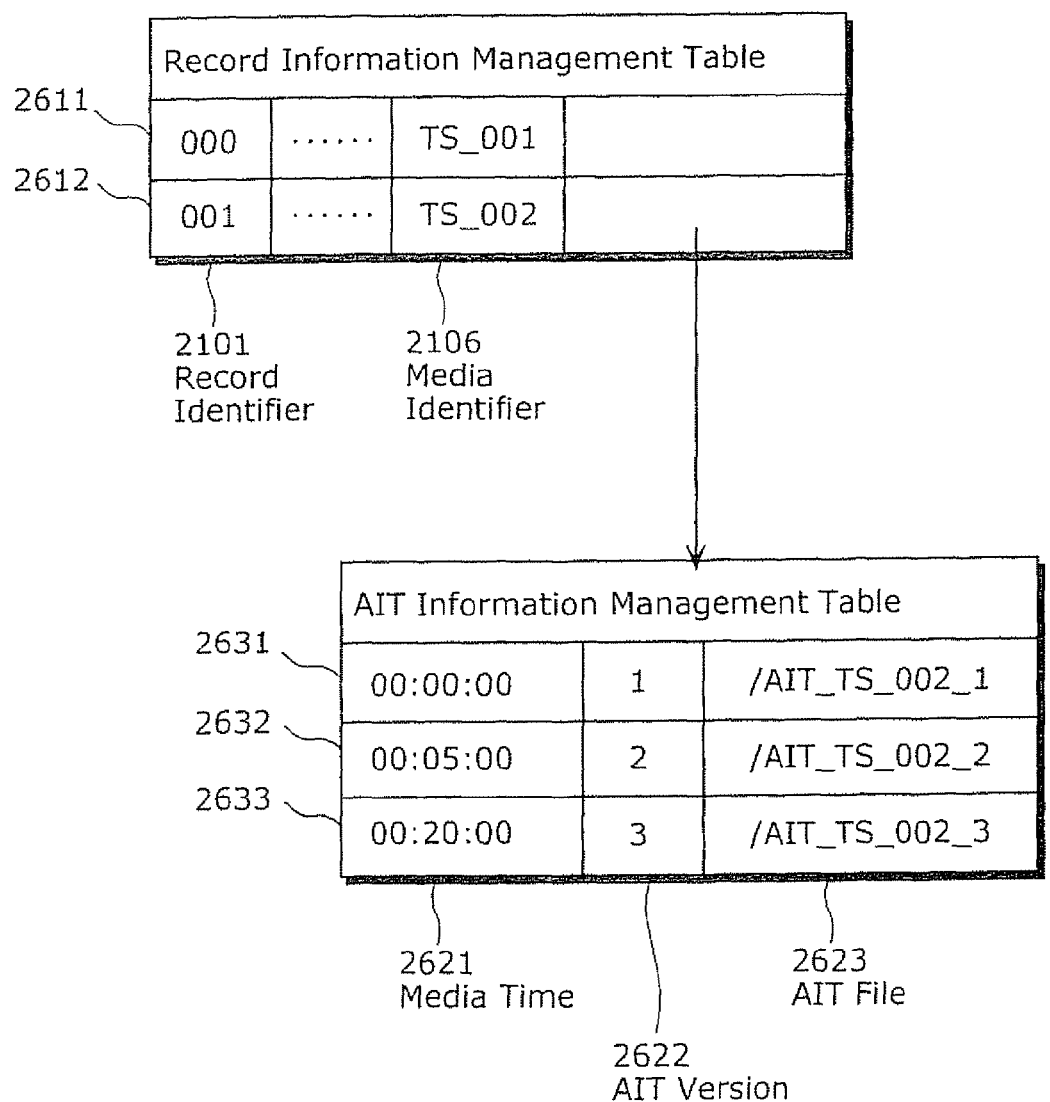
FIG. 26 is an example of a record information management table according to the present invention.

In addition, with regard to an AIT, the AIT is converted into a format of an expanded record information management table, as in FIG. 26, and is recorded into the recording area

1504. The record information management table shown in FIG. 26 is an expanded version of the record information management table shown in FIG. 21; items identified with the same numbers in both tables have the same meaning as those in the record information management table shown in FIG. 21. The descriptions are therefore omitted.

Each of rows 2611 and 2612 shows record information of one service. Each of the rows 2611, 2612 has a record identifier 2101, a channel identifier 2102, a program number 2103, a service record start time 2104, a service record end time 2105, a media identifier 2106, and a reference to an AIT information management table. The AIT information management table has a media time 2621 and is an AIT version 2622 corresponding thereto. The media time 2621 is the time at the time of reproduction of the corresponding MPEG-2 transport stream, and shows a position in the corresponding MPEG-2 transport stream. The AIT version number 2622 corresponds to an AIT version number 2200 in FIG. 22. For example, record information of the service that has "001" as a record identifier 2101 has "TS_002" as a media identifier 2106, and when the media time 2621 indicates "00:00:00" in the referred AIT information management table, the corresponding AIT version number 2622 is "1". In the same manner, when the media time 2621 indicates "00:05:00", the corresponding AIT version number 2622 is "2", and when the media time 2621 indicates "00:20:00", the corresponding AIT version number 2622 is "3". For example, at the time of reproduction of the service that has "001" as a channel identifier 2601, referring to the record information management table, the MPEG-2 transport stream that is multiplexed with the video and audio specified by the media identifier 2602 of "TS_002" is reproduced; in addition, referring to the AIT information management table, when the media time 2621 reaches "00:00:00", control which causes the Java program to start up or terminate is performed in accordance with the AIT with an AIT version number 2622 of "1". In a similar manner, the control which causes the Java program to start up or terminate is performed in accordance with the AIT with an AIT version number 2622 of "2" when the media time 2621 reaches "00:05:00", and in accordance with the AIT with an AIT version number 2622 of "3" when the media time 2621 reaches "00:20:00". The actual AIT is converted, as a binary file in private section format, into the file system format unique to the recording area 1504, which is in turn unique to a terminal, and is recorded into the recording area 1504. The recorded file is given a unique file name by which it can be uniquely identified, and which is recorded in the record information administration table as an AIT file name 2623.

In an actual broadcast wave, AITs with the same AIT version are repeatedly transmitted any number of times, but in the present embodiment, by detecting a change in the received AIT version, only the first AIT that is updated at that point in time is recorded into the recording area 1504.

FIG. 25 shows a conceptual rendering which represents the physical connection sequence, processing details, and input/output data format of each device during the reproduction of the service. Constituent elements in the diagram that have identical numbers to the constituent elements shown in FIG. 16 have already been described in the first embodiment, and therefore descriptions are omitted.

The hardware configuration shown in FIG. 25 differs from that in FIG. 16 in that the section recorded in the recording area 1504 is read into the primary storage without going through the TS decoder. The media time that corresponds to the present reproduction time of the MPEG-2 transport stream read out from the recording area is searched for, and the AIT and DSMCC file system corresponding to that media time are read out from the file.

Here, the case of reproducing, from the recording area 1504, the service corresponding to the channel identifier "001", using the AIT shown in FIG. 22 and the record information management table shown in FIG. 26, is taken as an example.

When the service corresponding to the channel identifier "001" is specified as a service to be reproduced, each of the audio, video and Java program belonging to and the service are reproduced and activated, as already mentioned in the description regarding the reproduction of the service.

In the case where a media time to start the reproduction is not specified, the reproduction is commenced from the media time 2621 of "00:00:00". In other words, as audio and video, the MPEG-2 transport stream, having a media identifier 2102 of "TS_002" corresponding to a record identifier 2101 of "001", is reproduced from the media time 2621 of "00:00:00". Referring to the AIT information management table, since the AIT version 2622 corresponding to the media time 2621 of "00:00:00" is "1", the AIT with the AIT version 2200 of "1" is read out from the file. Based on the details of the AIT, the Java program corresponding to the program name 2204 having control information 2202 of "autostart" is activated.

Then, the reproduction of the service continues, and when the position, at which the MPEG-2 transport stream corresponding to the media identifier "TS_002" is being reproduced, indicates the media time 2621 of "00:05:00", referring to the AIT information management table, since the AIT version number 2622 corresponding to the media time 2621 of "00:05:00" is "2", the Java program corresponding to the program name 2204 having control information 2202 of "autostart" is activated, and also, the Java program corresponding to the program name 2204 having control information 2202 of "destroy" or "kill" is terminated, based on the AIT with the AIT version number 2200 of "2". Here, referring to FIG. 22, the program name having control information 2202 of "destroy" is "/b/MusicXlet" and the program name having control information 2202 of "kill" is "/z/StudyXlet", therefore, in the case where the Java programs corresponding to these program names are executed at the media time 2621 of "00:05:00", those Java programs are terminated.

Then, the reproduction of the service continues, and when the position, at which the MPEG-2 transport stream corresponding to the media identifier 2106 "TS_002" is being reproduced, indicates the media time 2621 of "00:20:00", referring to the AIT information management table, the AIT version number 2622 corresponding to the media time 2621 of "00:20:00" is "3", therefore, the Java program corresponding to the program name 2204 having control information 2202 of "autostart" is activated, and also, the Java program corresponding to the program name 2204 having control information 2202 of "destroy" or "kill" is terminated, based on the AIT with the AIT version 2200 of "3".

According to the second embodiment described above, it is possible to combine the video and audio multiplexed by the multiplexer with the DSMCC file system and AIT file which are separately recorded in a different formats so as to reproduce the service. Thus, the DSMCC file system and AIT which are repeatedly transmitted any number of times through broadcast need to be recorded only for the amount equivalent to one update, so that it is possible to reduce the consumption of a memory capacity in a recording area.

(Third Embodiment)

Hereafter, the broadcast receiving terminal and the program execution method according to the third embodiment of the present invention are described with reference to the drawings.

The hardware configuration and the like used in the third embodiment are identical to the first embodiment of the present invention; therefore, FIGS. 1 to 16 shall be used. The constituent elements in the diagrams have the same function as those described in the first embodiment, descriptions are omitted.

The software configuration according to the third embodiment is the same as the one shown in FIG. 17. The constituent elements other than the service manager 1704f and the resource manager 1704g have the same function as the function of the constituent elements in the software configuration according to the first embodiment, therefore, descriptions are omitted. The various data formats used in the third embodiment are also the same as those shown in FIGS. 20 to 22, FIG. 30 and FIG. 31, therefore, descriptions are omitted.

FIG. 29 is a diagram showing detailed configurations of the service manager 1704f, the Tuner 1704c and the resource manager 1704g in the Java library 1704.

The Tuner 1704c is, as in the first embodiment, configured of the tuning control unit 2911 and the resource contention detection unit 2921.

As the tuning control unit 2911 has the same function as the one described in the first embodiment, descriptions are omitted.

In the case where the service manager 1704f or the like requests for a reservation of a tuner hardware resource, the resource contention detection unit 2921 detects a tuner resource contention with other programs, and asks the resource contention program distinguishing unit 2901 within the resource manager 1704g to resolve the contention.

The resource contention detection unit 2921 has, as a Java API, a reserve (tuner identifier) method for requesting for a reservation of a tuner. The program calls out this method and requests for a reservation of the tuner resource specified by the tuner identifier.

The reserve method being called out, the resource contention detection unit 2921 refers to the resource management information held by the resource management information holding unit 2903, and examines whether or not the specified tuner is already reserved. In the case where the specified tuner is already reserved by any of the programs, the resource contention detection unit 2921 gives, to the resource contention program distinguishing unit 2901 within the resource manager 1704g, a resource identifier which identifies that tuner and a program identifier which identifies the requester of the reservation of that tuner, so as to request the resource contention program distinguishing unit 2901 to resolve the contention of that tuner. The request for the reservation of a resource such as a tuner here is requested from a downloaded Java program or a program that is already incorporated into the terminal. The Java program and the terminal-incorporated program shall be both referred to as "program". In the case of the Java program, a Java program identifier is used as a program identifier, while in the case of the terminal-incorporated program, a program name is used as a program identifier. For example, in the case where the program that has a program identifier "EAS module" requests for a reservation of a tuner, "reserve (tuner)" is called, using a resource identifier "tuner" of the tuner to be reserved, as an argument, based on the Java method "reserve" provided for the Tuner 1704c for reserving a tuner. In such case, providing that another program has already reserved the tuner, the resource contention detection unit 2921 detects a resource contention as well as gives the resource identifier "tuner" and the program identifier "EAS module", so as to request the resource manager 1704g to resolve the resource contention.

The resource manager 1704g is, as in the first embodiment, configured of the resource contention program distinguishing unit 2901, the resource contention program processing unit 2902, the resource management information holding unit 2903, the end program information holding unit 2904, the resource contention handler registration unit 2905 and the resource contention handler registration privilege judgment unit 2906.

The constituent elements other than the resource contention program distinguishing unit 2901 have the same function as those described in the first embodiment, descriptions are omitted.

In the case where the Tuner 1704c or the like requests for a reservation of a resource such as a tuner, the resource contention program distinguishing unit 2901 calls a resource contention handler which is registered in the resource contention handler registration unit 2905 by a privileged Java program, or resolves a resource contention based on the priority level of the program with reference to the resource management information held in the resource management information holding unit 2903, and notifies the resource contention program processing unit 2902 of the program which permits the reservation of the requested resource. In the case of holding the resource priority reserve program information shown in FIG. 35, and also being requested to reserve a resource such as a tuner by the Tuner 1704c, the resource contention program distinguishing unit 2901 judges whether the requester of the reservation of that resource is the program to which the reservation of that resource is permitted, with reference to the resource priority reserve program information, and also, requests the resource contention program processing unit 2902 to allocate a resource to an appropriate program, or the like.

FIG. 35 is a diagram which shows an example of the resource priority reserve program information held by the resource contention program distinguishing unit 2901. A forcedly-reserved resource 3511 is a resource identifier which identifies the resource which is permitted to be forcedly reserved by the corresponding priority program 3512, whereas the priority program 3512 is a program identifier which identifies the program that is permitted to reserve the corresponding forcedly-reserved resource 3511 with priority over other programs. Here, a program executed in the OS 1701 or a Java program executed in the Java VM 103 is taken as an example of such program. For example, row 3501 indicates that a program called "module B" is permitted to forcedly reserve a resource "tuner" with the priority over other programs.

The operation characteristic to the present embodiment applying the configuration as described above will be described below with reference to a flowchart.

The flow of the operation in the case where a Java program registers a resource contention handler into the resource contention handler registration unit 2905 in the resource manager 1704g is as same as the one described in the first embodiment, therefore, FIG. 32 shall be used.

Figure 36:
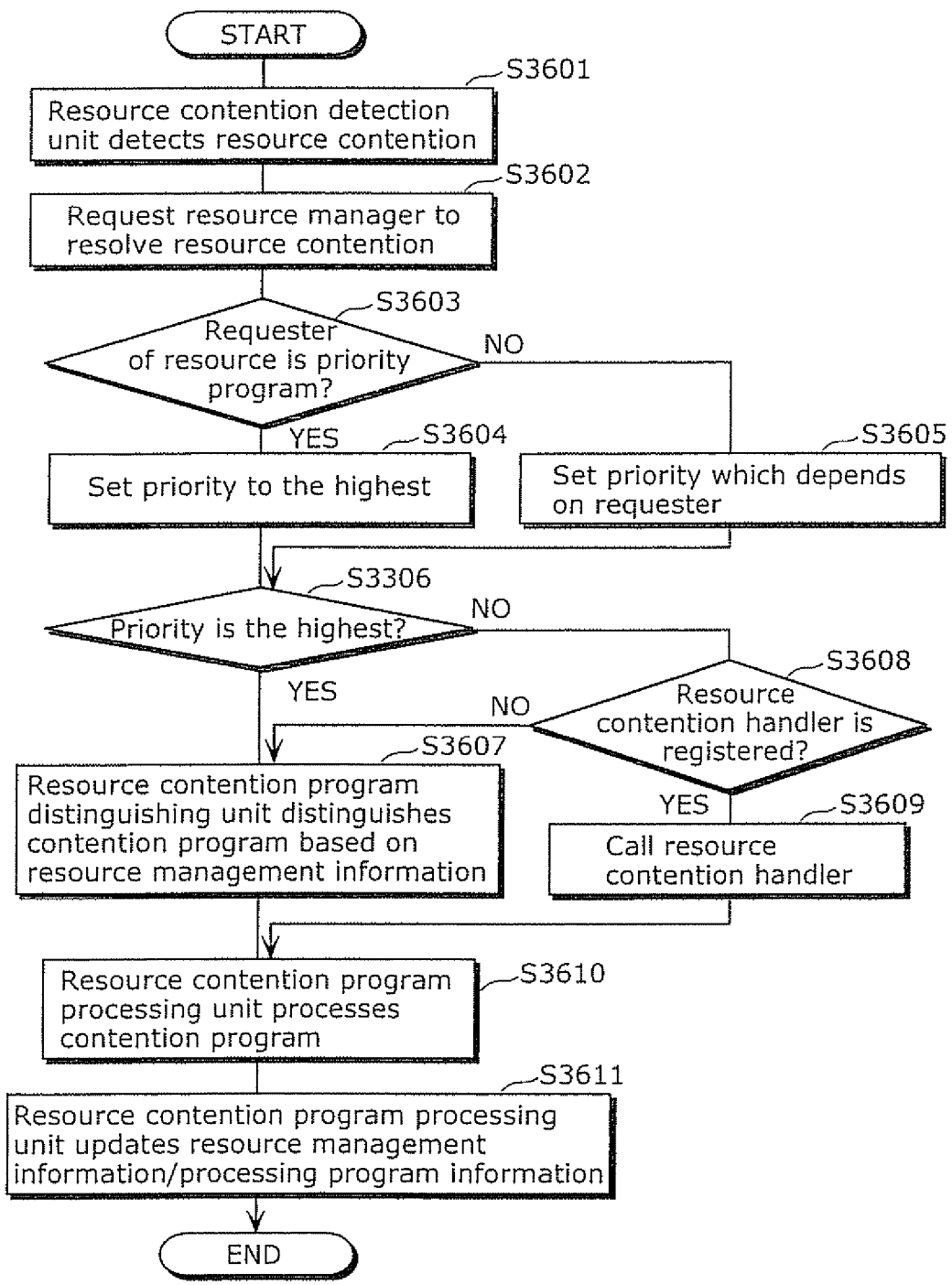
FIG. 36 is a flowchart for resolving a resource contention when a forced tuning occurs, according to the present invention.

FIG. 36 is a flowchart showing how a contention of a resource such as a tuner is resolved in the case where a forced tuning is caused by the EAS module 1701c.

When a forced tuning is caused by the EAS module 1701c, the EAS module 1701c outputs a channel identifier and a valid time of the forced tuning to the service manager 1704f.

Next, with the channel identifier as a key, the service manager 1704f obtains tuning information that corresponds to the channel identifier, from channel information held by the library 1701b. After that, when the tuning information is supplied to the Tuner 1704c, the Tuner 1704c commences tuning. Here, the tuning information is information that can specify a frequency, a modulation method, and the like. In the case of detecting a tuner resource contention between the forced tuning and the service that is already executed (S3601), the resource contention detection unit 2921 passes, to the resource manager 1704g, a resource identifier which identifies the tuner in contention and a program identifier which identifies the requester of the tuner, so as to request the resource manager 1704g to resolve the resource contention (S3602). Then, the resource contention program distinguishing unit 2901 in the resource manager 1704g refers to the held resource priority reserve program information, and judges whether the requester of that resource is permitted to forcedly reserve that resource with priority over other programs (S3603). In the case where the requester program is permitted to forcedly reserve that resource, the priority level of the program is set to the highest (S3604). In the case otherwise, an appropriate value is set for the priority level which depends on the requester program of the service (S3605). In the case where the priority level is the highest (S3606), the resource contention program distinguishing unit 2901 refers to the resource management information held in the resource management information holding unit 2903, and distinguishes the contention program which reserves that resource (S3607). The resource contention program distinguishing unit 2901 passes a program identifier which identifies the distinguished contention program to the resource contention program processing unit 2902, seizes a resource in contention from that contention program, and notifies the contention program that the resource is seized as well as notifies the requester program that the seized resource is reserved (S3610). Moreover, the resource contention program distinguishing unit 2901 updates, based on the result, the resource management information held in the resource management information holding unit 2903 and the processing program information held in the processing program information holding unit 2904 (S3611). In the case where the passed priority level is not the highest in S3606, it is judged whether the resource contention handler registration unit 2905 has the resource contention handler that has previously been registered by a privileged Java program (S3608). In the case where such resource contention handler is registered, the resource contention program distinguishing unit 2901 consigns the resolution of that resource to the resource contention handler by calling the resource contention handler (S3609). In the case where such resource contention handler is not registered, the resource contention program distinguishing unit 2901 refers to the resource management information held in the resource management information holding unit 2903, and distinguishes the contention program which reserves that resource (S3607). In the case where the priority level corresponding to the distinguished contention program is compared with the self-possessing priority level, and as a result, the latter is higher, the resource contention program distinguishing unit 2901 passes a program identifier which identifies that contention program to the resource contention program processing unit 2902, seizes a resource in contention from the contention program, and notifies the contention program that the resource is seized as well as notifies the requester program that the seized resource is reserved (S3610). Moreover, the resource contention program distinguishing unit 2901 updates, based on the result, the resource management information held in the resource management information holding unit 2903 and the processing program information held in the processing program information holding unit 2904 (S3611). In S3611, a program identifier which identifies the program that is deprived of the resource by the program in contention and a resource identifier which identifies that resource are held, as the processing program information, in an associated manner in the processing program information holding unit 2904.

The flow of the operation in the case of reallocating a resource such as a tuner to the program that was reserving that resource prior to a forced tuning caused by the EAS module 1701c, after the valid time of the forced tuning has elapsed, is as same as the one described in the first embodiment, therefore, FIG. 34 shall be used.

As described above, even in the case where a forced tuning is caused by the EAS module 1701c, the resource contention program distinguishing unit 2901 refers to resource priority reserve program information, and also distinguishes the program that is permitted to forcedly reserve a resource with priority over other programs. Thus, it is possible to rapidly execute a forced tuning so as to notify the user of an alert, without destroying the conventional framework for solving the problem of resource contention and without unexpected blocking upon calling a resource contention handler which is already registered by a privileged Java program.

Some of the embodiments described above indicate embodiments of the present invention, but other embodiments can be considered without deviating from the scope of the present invention.

In the embodiments, a configuration for a cable system has been shown, but the present invention can be applied independent of the type of broadcast system. For example, the present invention can easily be applied to a satellite system, a ground wave system, or a TV show distribution system that uses an IP network. In addition, as the present invention has no direct relationship with the differences between each broadcast system, the present invention can be applied to an arbitrary transmission medium regardless of the broadcast system. The present invention is also applicable regardless of whether the system is a wired or wireless system.

It is not necessary for the AV decoder to decode video and audio at the same time. The present invention can be implemented even if the AV decoder is configured as separate video and audio decoders. In addition, the AV decoder may have a decode function for data such as closed captioning and the like without any interference. The audio signal and video signal decoded by the AV decoder may be scrambled at any stage up until being stored in the recording area 1504.

In the embodiments, an example is given in which an adapter that controls conditional access system has been introduced, but the adapter is not necessary for the implementation of the present invention. The adapter may be of any format, and a configuration without the adapter is also possible. In such a case, in FIG. 15, the MPEG-2 transport stream from the tuner is inputted directly into the TS decoder. The present invention is applicable is such a case as well. In addition, descrambling of the MPEG-2 transport stream by the adapter does not necessarily have to be carried out before the TS decoder. A configuration in which the adapter is in an arbitrary position and is used to descramble the MPEG-2 transport stream is easily implementable, and the present invention is applicable in such a case as well.

Regarding an encoding format into which the AV encoder encodes the audio and video signal, an arbitrary format is acceptable. The present invention is applicable regardless of the encoding format.

A multiplexing format of the multiplexer may also be an arbitrary format. The present invention is applicable regardless of the multiplexing format.

The display and the speaker may be contained within the broadcast recording and reproduction apparatus, or an external display and speaker may be connected to the broadcast recording and reproduction apparatus. The present invention is applicable regardless of the location and number of the display and speaker.

The present invention can be implemented even if the CPU itself is a system which performs multiple processes, the operations being all or some of TS decoding, AV decoding, AV encoding, and multiplexing.

As a format for recording the service, the MPEG-2 transport stream can also be recorded directly into the recording area after being outputted from the tuner, without going through the TS decoder; or, the format of the MPEG-2 transport stream from the tuner can be converted, by installing a translator that converts the format of the MPEG-2 transport stream, and recorded into the recording area. The present invention can be implemented regardless of the service recording method.

Some of the Java virtual machines translate the bytecode into an executable form which can be interpreted by the CPU, and pass the resultant to the CPU which executes it; the present invention is applicable in such case as well.

The above embodiments describe a method for implementation regarding the AIT in which the transport stream is obtained from in-band; however, the method for referring to the Java program which the AM shall execute does not solely depend on the AIT. In the OCAP which is assumed to be used in the US cable system, XAIT which describes reference information of an application program is utilized in the OOB shown in FIG. 3. In addition, methods such as starting a program pre-recorded in the ROM, starting a program downloaded and recorded in the secondary storage unit, and so on can be considered.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

With the broadcast receiving terminal and the program execution method according to the present invention, it is possible to rapidly execute a forced tuning so as to notify the user of an alert, without destroying the conventional framework for solving the problem of resource contention and without unexpected blocking upon calling a resource contention handler that is already registered by a privileged lava program. For example, the present invention is applicable to cable STB, digital TV, and the like. Furthermore, the present invention is also applicable in devices with a broadcast receiving function, such as, for example, a cellular phone device and the like.

What is claimed is:

1. A broadcast receiving terminal, comprising:
    a processor;
    a program executioner configured to control execution of a program among a plurality of programs including a specified program according to a priority level of the program;
    a resource contention detector configured, in a case where a reservation of a resource is requested according to the execution of the program performed by said program executioner, to detect whether or not a contention of the resource occurs due to a fact that the requested resource has already been reserved by another program executed by said program executioner;
    a resource reservation program determiner configured to determine whether or not the program reserves the resource, and
    a resource reservation program notifier configured to notify of the reservation of the resource which is permitted to reserve the resource, based on the determination made by said resource reservation program determiner, wherein,
        (i) when the contention occurs and the program requesting the reservation of the resource is not the specified program,
            (i-a) in the case where a resource contention handler is registered, call the resource contention handler for resolving the contention and determine to permit a program according to a priority level returned from the resource contention handler, and
            (i-b) in the case where the resource contention handler is not registered, determine to permit the program to reserve the resource which is under contention, according to the priority level of the program, and
        (ii) when the contention occurs and the program requesting the reservation of the resource is the specified program,
            the resource reservation program determiner permits the specified program to reserve the resource without using the resource contention handler and checking whether or not the resource contention handler is registered; and
            the resource reservation program determiner, after the specified program has been executed, has the resource reservation program notifier notify that the resource has been released by the specified program.

2. A program execution method for executing a program in a broadcast receiving terminal, comprising:
    controlling, via a program executioner, execution of a program among a plurality of programs including a specified program according to a priority level of the program;
    detecting, via a resource contention detector, when a reservation of a resource is requested according to the execution of the program performed by said program executioner, whether or not a contention of the resource occurs due to a fact that, the requested resource has already been reserved by another program executed by said program executioner;
    determining, via a resource reservation program determiner, whether or not the program reserves the resource, and
    notifying, via a resource reservation program notifier, of the reservation of the resource which is permitted to reserve the resource, based on the determination made by said resource reservation program determiner, wherein,
        (i) when the contention occurs and the program requesting the reservation of the resource is not the specified program,
            (i-a) in the case where a resource contention handler is registered, call the resource contention handler for resolving the contention and determine to permit a program according to a priority level returned from the resource contention handler, and (i-b) in the case where the resource contention handler is not registered, determine to permit the program to reserve the resource which is under contention, according to the priority level of the program, and (ii) when the contention occurs and the program requesting the reservation of the resource is the specified program, permitting, via the resource reservation program determiner, the specified program to reserve the resource without using the resource contention handler and checking whether or not the resource contention handler is registered; and the resource reservation program determiner, after the specified program has been executed, has the resource reservation program notifier notify that the resource has been released by the specified program.

\* \* \* \* \*